(12) United States Patent
Wilkinson et al.

(10) Patent No.: US 11,651,089 B2
(45) Date of Patent: May 16, 2023

(54) TERMINATING DISTRIBUTED TRUSTED EXECUTION ENVIRONMENT VIA SELF-ISOLATION

(71) Applicant: Graphcore Limited, Bristol (GB)

(72) Inventors: Daniel John Pelham Wilkinson, Bristol (GB); Stavros Volos, Cambridge (GB); Kapil Vaswani, Cambridge (GB); Balaji Vembu, Folsom, CA (US)

(73) Assignee: GRAPHCORE LTD., Bristol (GB)

( * ) Notice: Subject to any disclaimer, the term of this patent is extended or adjusted under 35 U.S.C. 154(b) by 0 days.

(21) Appl. No.: 17/305,708

(22) Filed: Jul. 13, 2021

(65) Prior Publication Data

US 2023/0020255 A1 Jan. 19, 2023

(51) Int. Cl.
*G06F 21/60* (2013.01)
*G06F 21/53* (2013.01)

(52) U.S. Cl.
CPC ............ *G06F 21/606* (2013.01); *G06F 21/53* (2013.01); *G06F 21/602* (2013.01); *G06F 2221/2141* (2013.01); *G06F 2221/2143* (2013.01); *G06F 2221/2149* (2013.01)

(58) Field of Classification Search
CPC ...... G06F 21/606; G06F 21/53; G06F 21/602; G06F 2221/2141; G06F 2221/2143; G06F 2221/2149
See application file for complete search history.

(56) References Cited

U.S. PATENT DOCUMENTS

| | | | |
|---|---|---|---|
| 8,296,419 B1* | 10/2012 | Khanna | G06F 9/5083 718/1 |
| 9,754,116 B1* | 9/2017 | Roth | G06F 21/602 |
| 10,579,465 B1* | 3/2020 | Neustrom | G06F 11/0721 |
| 2005/0198522 A1* | 9/2005 | Shaw | G06F 21/606 726/22 |
| 2007/0256119 A1* | 11/2007 | Higashikado | H04L 41/0853 726/4 |
| 2012/0311344 A1* | 12/2012 | Sabin | G06F 9/45533 718/1 |
| 2017/0192809 A1* | 7/2017 | Kaufer | G06F 9/45558 |
| 2017/0279826 A1* | 9/2017 | Mohanty | H04L 67/1004 |
| 2017/0353496 A1* | 12/2017 | Pai | H04L 63/1433 |
| 2018/0063102 A1* | 3/2018 | Secatch | G06F 1/24 |
| 2019/0050560 A1* | 2/2019 | Pereira | G06F 9/45558 |
| 2020/0218669 A1* | 7/2020 | Gilsdorf | G11C 7/24 |
| 2020/0301726 A1* | 9/2020 | Singh | G06F 9/5077 |
| 2022/0171883 A1* | 6/2022 | Bursell | H04L 9/0819 |

* cited by examiner

*Primary Examiner* — Shin-Hon (Eric) Chen
*Assistant Examiner* — Ethan V Vo
(74) *Attorney, Agent, or Firm* — Haynes and Boone, LLP

(57) ABSTRACT

A method for securely terminating a distributed trusted execution environment spanning a plurality of work accelerators. Each accelerator is configured to self-isolate upon determining that the distributed TEE is to be terminated across the system of accelerators. The data is also wiped from the processor memory of each accelerator, such that the data cannot be read out from the processor memory once the accelerator's links are re-enabled. The self-isolation is performed on each accelerator prior to the step of terminating the TEE on that accelerator. An accelerator only re-enables its links to other accelerators once the data is wiped from its processor memory such that the secret data is removed from the accelerator memory.

19 Claims, 18 Drawing Sheets

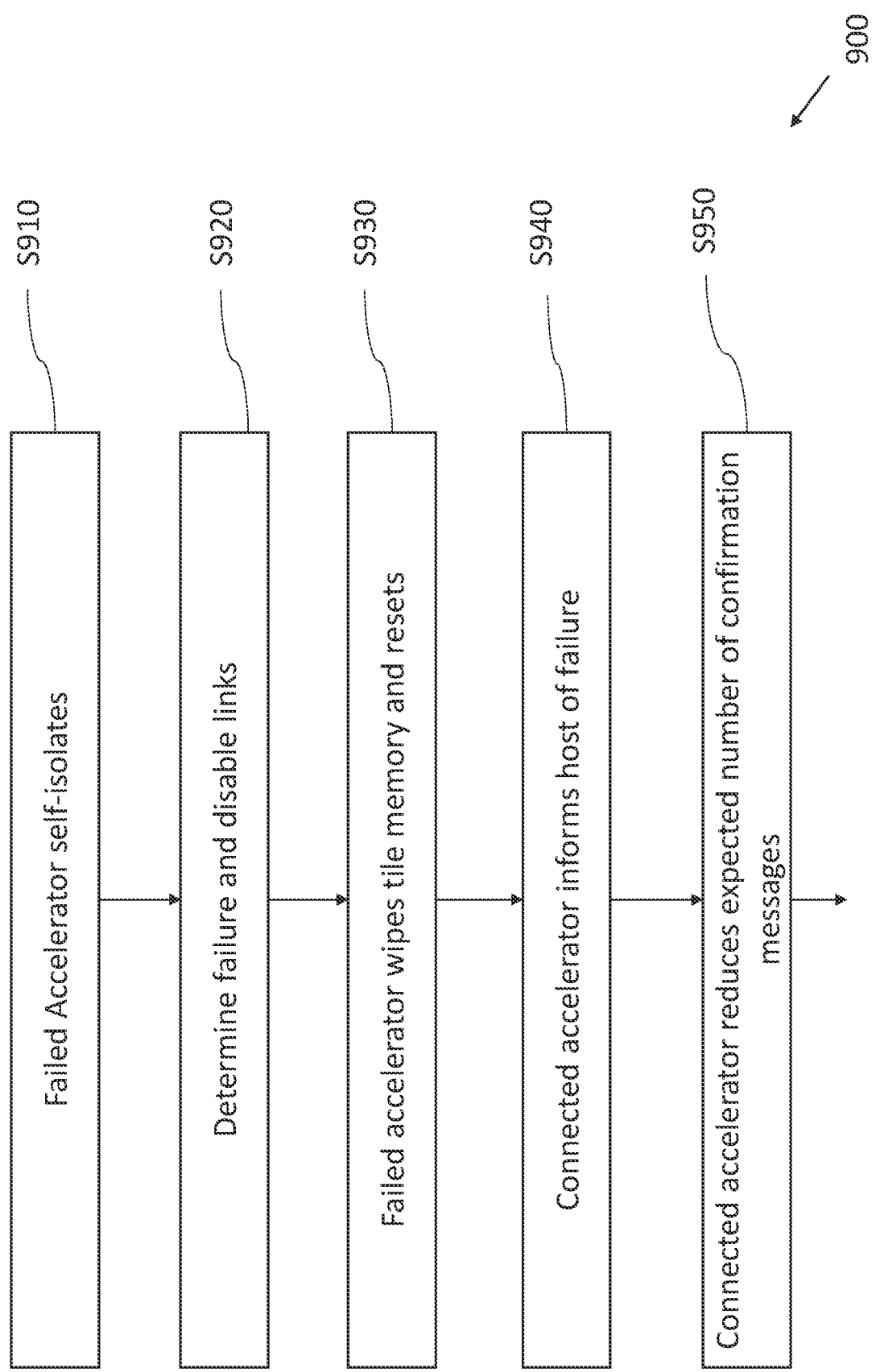

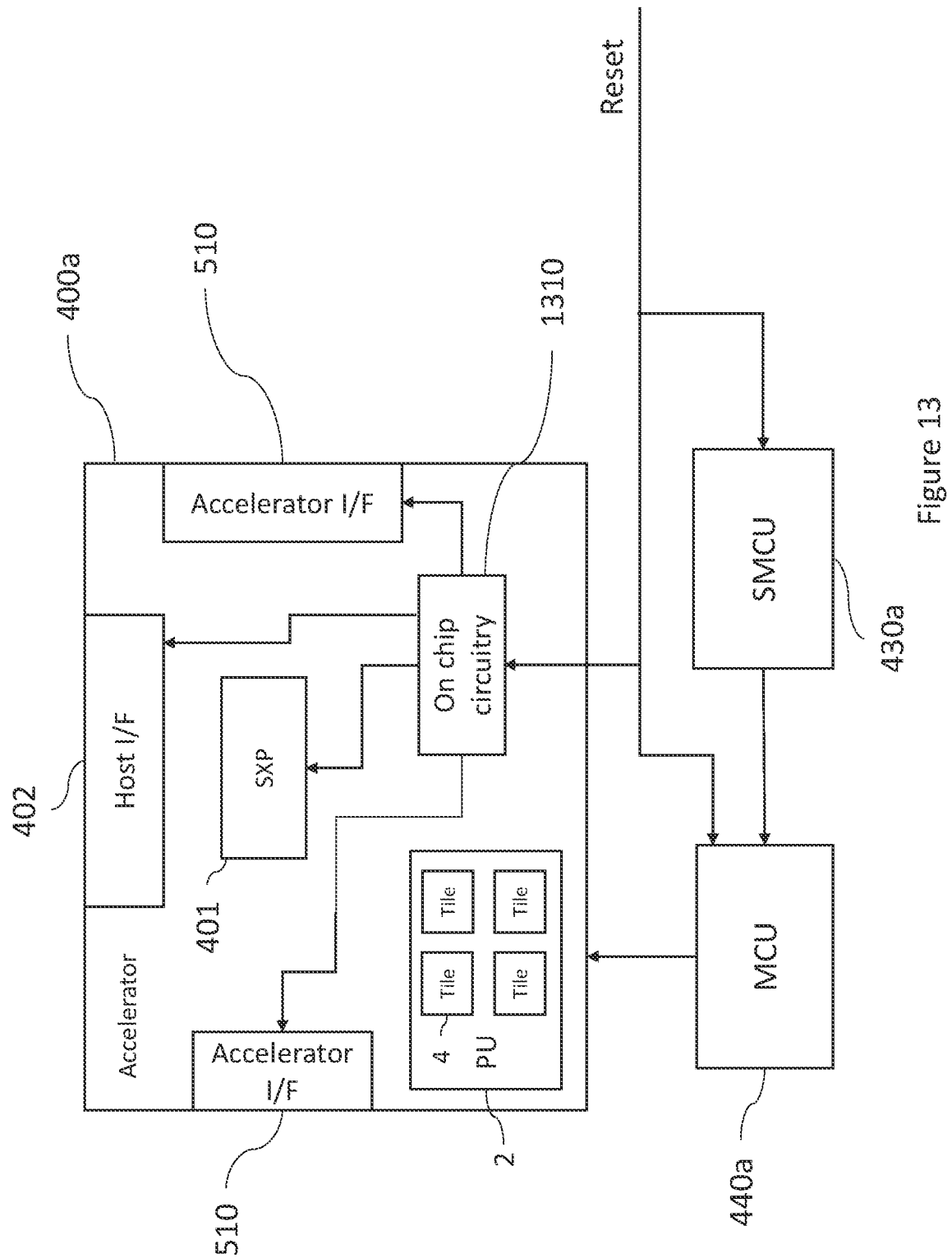

TERMINATING DISTRIBUTED TRUSTED EXECUTION ENVIRONMENT VIA SELF-ISOLATION

TECHNICAL FIELD

The present disclosure relates to a plurality of accelerator subsystems for processing workloads provided by an untrusted host system, and in particular to the termination of a trusted execution environment spanning the plurality of accelerators.

BACKGROUND

In the context of processing data for complex or high volume applications, a work accelerator may be a subsystem to which processing of certain data is offloaded from a host system. Such a work accelerator may include specialised hardware for performing specific types of processing of workloads. Input data may be provided to the work accelerator by the host system, with the work accelerator performing processing of that input data and returning results of the processing to the host system.

In some circumstances, in order to provide for increased processing capabilities, a plurality of accelerator subsystems may be provided and connected together. In this way, an application can be distributed across a plurality of such subsystems, enabling larger workloads to be processed in a given amount of time.

SUMMARY

Input data that is provided to the accelerator, and the results that are returned from the accelerator to the host system, may be of a confidential nature. In such a case, it is desirable to protect the confidentiality of such data so as to prevent that data from being intercepted and interpreted by a malicious third party. Such confidentiality may be achieved by forming a trusted execution environment (TEE) on the work accelerator. A TEE may be provided by ensuring that input data is encrypted and authenticated, and optionally protected against replay attacks, before being provided to the work accelerator, and that the results are encrypted by the work accelerator before being output from the work accelerator. In this way, a malicious third party, who does not have access to the internal contents of the work accelerator, is unable to access and interpret the input data or the output results of the work accelerator, and is unable to cause the work accelerator to operate on data it was not expecting to receive.

When a plurality of accelerator subsystems are connected together, a distributed TEE spanning the plurality of connected accelerator subsystems may then be provided by each of the local TEEs formed on the individual accelerators. A variety of circumstances may arise in which it is desirable to terminate the distributed TEE spanning the system of accelerators. A first such scenario is that the processing of the workload has completed. In this case, the distributed TEE should be terminated so as permit the accelerator subsystems to be suitably reset for the processing of further workloads. A second scenario is that the host has a firmware upgrade to deploy to the accelerators or to hardware associated with the accelerators. Providing the host with the necessary access to deploy the update may require the distributed TEE to first be terminated. A third scenario is when one of the accelerators or hardware associated with the accelerators encounters an unrecoverable error condition.

When terminating the distributed TEE, there are important security considerations to be taken into account. If the TEE on one of the connected accelerators is terminated, without the TEE on a connected accelerator being terminated, there is the possibility that a third party could inject malicious code into the accelerator on which the TEE is terminated. This malicious code could read the confidential data from the connected accelerator on which the TEE is not yet terminated, since the traffic between the accelerators is not encrypted or authenticated. There is, therefore, a possible security flaw in such a system of accelerators in which is provided a distributed TEE.

According to a first aspect, there is provided a system comprising a plurality of accelerator subsystems for processing workloads provided by an untrusted host system, wherein each of the accelerator subsystems comprises: at least one processor for executing application instructions to perform operations using workload data to produce results data; at least one processor memory for storing the workload data and the results data; at least one encryption unit configured to perform encryption and decryption operations so as to provide a trusted execution environment on the respective accelerator subsystem, wherein the provision of the trusted execution environments on each of the accelerator subsystems provides a distributed trusted execution environment across the plurality of accelerator subsystems for processing the workloads; and one or more interfaces for interfacing with one or more connected ones of the accelerator subsystems and exchanging data with those one or more connected ones of the accelerator subsystems, wherein each of the accelerator subsystems is associated with processing circuitry configured to, in response to determining that the distributed trusted execution environment is to be terminated, perform the following steps with respect to its associated accelerator subsystem: causing the associated accelerator subsystem to self-isolate by preventing traffic from being received over the one or more interfaces from the one or more connected ones of the accelerator subsystems; causing the workload data and the results data to be erased from the at least one processor memory of the associated accelerator subsystem; subsequent to causing the associated accelerator subsystem to self-isolate, causing the trusted execution environment on the associated accelerator subsystem to be terminated; and subsequent to the causing of the workload data and the results to be erased, initiating, for the associated accelerator subsystem, reactivation of communication links with the one or more connected ones of the accelerator subsystems.

Each accelerator is configured to self-isolate upon determining that the distributed TEE is to be terminated across the system of accelerators. The data is also wiped from the processor memory of each accelerator, such that the data cannot be read out from the processor memory once the accelerator's links are re-enabled. The self-isolation is performed on each accelerator prior to the step of terminating the TEE on that accelerator. In this way, since the accelerators have all self-isolated from one another, even if, following the termination of the TEE on one of the accelerators, a malicious third party were to inject malicious code into that accelerator, they would be unable to read out the confidential data from the other accelerators, since those other accelerators have self-isolated and are not accessible to the accelerator on which the TEE has been terminated. An accelerator only initiates re-enabling of its links to other accelerators once the confidential data is wiped from its processor memory. In this way, a mechanism is provided for ensuring that, when the distributed TEE is terminated, malicious third parties are unable to read out confidential data from the accelerators.

In some embodiments, for each of the accelerator subsystems, at least part of the processing circuitry associated with the respective accelerator subsystem belongs to a root of trust associated with the respective accelerator subsystem.

In some embodiments, for each of one or more of the accelerator subsystems, the associated processing circuitry is configured to determine that the trusted execution environment is to be terminated in response to receipt of a command from the host system.

In some embodiments, the processing circuitry associated with a first of the accelerator subsystems is configured to determine that the distributed trusted execution environment is to be terminated in response to determining that a second of the accelerator subsystems connected to the first of the accelerator subsystems has self-isolated.

In some embodiments, the step of determining that the second of the accelerator subsystems connected to the first of the accelerator subsystems has self-isolated is performed in response to a message received at the first of the accelerator subsystems from the second of the accelerator subsystems, prior to the second of the accelerator subsystems disabling its link with the first of the accelerator subsystems.

In some embodiments, the step of determining that the second of the accelerator subsystems connected to the first of the accelerator subsystems has self-isolated is performed in response to detecting, at the first of the accelerator subsystems, that a link with the second of the accelerator subsystems has been disabled by the second of the accelerator subsystems.

In some embodiments, for each of one or more of the accelerator subsystems, the processing circuitry associated with the respective accelerator subsystem is configured to determine that the distributed trusted execution environment is to be terminated in response to receipt of a reset signal for resetting a root of trust associated with the respective accelerator subsystem.

In some embodiments, for each of one or more of the accelerator subsystems, the processing circuitry associated with the respective accelerator subsystem is configured to: perform the step of causing the workload data and the results data to be erased prior to the step of causing the trusted execution environment on the associated accelerator subsystem to be terminated.

In some embodiments, for each of one or more of the accelerator subsystems, the processing circuitry associated with the respective accelerator subsystem is configured to: in response to determining that the distributed trusted execution environment is to be terminated, disable access by the untrusted host system to the at least one processor memory; and perform the step of causing the trusted execution environment on the associated accelerator subsystem to be terminated subsequent to the disabling of access to the at least one processor memory by the untrusted host system, and prior to the causing the workload data and the results data to be erased.

In some embodiments, the disabling of access to the at least one processor memory by the untrusted host system comprises disabling a link between the untrusted host system and the associated accelerator subsystem.

In some embodiments, for each of the one or more of the accelerator subsystems, the processing circuitry associated with the respective accelerator subsystem is configured to: subsequent to the step of causing the workload data and the results data to be erased, re-enable access by the untrusted host system to the at least one processor memory.

In some embodiments, for each of one or more of the accelerator subsystems, the processing circuitry associated with the respective accelerator subsystem is configured to determine that the trusted execution environment is to be terminated in response to receipt of an indication of a failure condition on the associated accelerator subsystem.

In some embodiments, for each of the plurality of accelerator subsystems, the processing circuitry associated with the respective accelerator subsystem is configured to perform the step of causing the trusted execution environment to be terminated by issuing a command to cause state stored in the at least one encryption unit to be reset.

In some embodiments, for each of the plurality of accelerator subsystems, the causing the trusted execution environment to be terminated on the respective accelerator subsystem comprises causing keys used for the encryption and decryption operations to be erased from the respective at least one encryption unit.

In some embodiments, for each of the accelerator subsystems, the step of causing the workload data and results data to be erased from the at least one processor memory comprises causing a hardware module of the respective accelerator subsystem to issue data packets to write zeroes to the at least one processor memory.

In some embodiments, each of the communication links is configured to be re-enabled in response to both accelerator subsystems between which it passes data, initiating reactivation of the respective communication link.

In some embodiments, for each of the accelerator subsystems, the processing circuitry associated with the respective accelerator subsystem is configured to: prior to the causing the workload data and results data to be erased from the at least one memory, disable host access to the accelerator subsystem by adjusting settings in an interface of the accelerator subsystem for interfacing with the host.

According to a second aspect, there is provided a method for terminating a distributed trusted execution environment across a plurality of accelerator subsystems, the plurality of accelerator subsystems being configured to process workloads provided by an untrusted host system, wherein the distributed trusted execution environment is provided by a plurality of local trusted execution environments, each of which is established on one of the accelerator subsystems, wherein the method comprises: for each of the accelerator subsystems, in response to determining that the distributed trusted execution environment is to be terminated: causing the respective accelerator subsystem to self-isolate by preventing traffic from being received over one or more interfaces of the respective accelerator subsystem from one or more connected ones of the accelerator subsystems; causing workload data and results data to be erased from memory of the respective accelerator subsystem; subsequent to causing the respective accelerator subsystem to self-isolate, causing the local trusted execution environment provided on the respective accelerator subsystem to be terminated; and subsequent to the step of causing the workload data and the results to be erased, initiate reactivation of communication links with the respective one or more connected ones of the accelerator subsystems.

In some embodiments, the method is performed by a plurality of processing circuits associated with each of the accelerator subsystems, wherein each of the processing circuits forms part of a root of trust for the accelerator subsystem associated with the respective processing circuit.

In some embodiments, the method comprises, for each of one or more of the accelerator subsystems, determining that the trusted execution environment is to be terminated in response to receipt of a command from the host system.

In some embodiments, the method comprises, at a first of the accelerator subsystems, determining that the distributed trusted execution environment is to be terminated in response to determining that a second of the accelerator subsystems connected to the first of the accelerator subsystems has self-isolated.

In some embodiments, the step of determining that the second of the accelerator subsystems connected to the first of the accelerator subsystems has self-isolated is performed in response to a message received at the first of the accelerator subsystems from the second of the accelerator subsystems, prior to the second of the accelerator subsystems disabling its link with the first of the accelerator subsystems.

In some embodiments, the step of determining that the second of the accelerator subsystems connected to the first of the accelerator subsystems has self-isolated is performed in response to detecting at the first of the accelerator subsystems that a link with the second of the accelerator subsystems has been disabled by the second of the accelerator subsystems.

In some embodiments, the method comprises, for each of one or more of the accelerator subsystems, determining that the distributed trusted execution environment is to be terminated in response to receipt of a reset signal for resetting a root of trust associated with the respective accelerator subsystem.

In some embodiments, the method comprises, for each of one or more of the accelerator subsystems, performing the step of causing the workload data and the results data to be erased prior to the step of causing the trusted execution environment on the associated accelerator subsystem to be terminated.

In some embodiments, the method comprises, for each of one or more of the accelerator subsystems, in response to determining that the distributed trusted execution environment is to be terminated, disabling access by the untrusted host system to the respective at least one processor memory; and performing the step of causing the trusted execution environment on the associated accelerator subsystem to be terminated, subsequent to the disabling of access to the at least one processor memory by the untrusted host system, and prior to the causing the workload data and the results data to be erased.

In some embodiments, the disabling of access to the at least one processor memory by the untrusted host system comprises disabling a link between the untrusted host system and the associated accelerator subsystem.

In some embodiments, the method comprises, for each of the one or more of the accelerator subsystems, subsequent to the step of causing the workload data and the results data to be erased, re-enabling access by the entrusted host system to the at least one processor memory.

In some embodiments, the method comprises, for each of one or more of the accelerator subsystems, determining that the trusted execution environment is to be terminated in response to receipt of an indication of a failure condition on the associated accelerator subsystem.

In some embodiments, the method comprises, for each of the plurality of accelerator subsystems, performing the step of causing the trusted execution environment to be terminated by issuing a command to cause state stored in the at least one encryption unit to be reset.

In some embodiments, the method comprises, for each of the plurality of accelerator subsystems, the causing the trusted execution environment to be terminated on the respective accelerator subsystem comprises causing keys used for the encryption and decryption operations to be erased from the respective at least one encryption unit.

In some embodiments, for each of the accelerator subsystems, the step of causing the workload data and results data to be erased from the at least one processor memory comprises causing a hardware module of the respective accelerator subsystem to issue data packets to write zeroes to the at least one processor memory.

In some embodiments, the method comprises each of the communication links being re-enabled in response to both accelerator subsystems between which it passes data, initiating reactivation of the respective communication link.

In some embodiments, the method comprises, for each of the accelerator subsystems, prior to the causing the workload data and results data to be erased from the at least one memory, disabling host access to the accelerator subsystem by adjusting settings in an interface of the accelerator subsystem for interfacing with the host.

According to a third aspect, there is provided a computer program comprising sets of computer readable instructions, wherein each of the sets of computer readable instructions is associated with one of a plurality of accelerator subsystems for processing workloads provided by an untrusted host system, wherein when each set of computer readable instructions is executed by at least one processor, a method according to any embodiment of the second aspect is performed.

According to a fourth aspect, there is provided a non-transitory computer readable medium storing the computer program according to the third aspect.

BRIEF DESCRIPTION OF DRAWINGS

For a better understanding of the present disclosure and to show how the same may be carried into effect, reference will now be made by way of example to the following drawings.

FIG. 9 is an example of steps used with the first method when one of the accelerators has encountered a failure condition;

FIG. 13 illustrates the exchange of signals in a system when a reset event has occurred, causing termination of the distributed TEE.

DETAILED DESCRIPTION

The present disclosure relates to a device having a system comprising a plurality of accelerator subsystems for processing workloads received from a host. In some embodiments to be described, each of the accelerator subsystems comprises a multi-tile processing unit.

An example multi-tile processing unit 2 is described with reference to FIG. 1. This example such processing unit 2 may take the form of the IPU (Intelligence Processing Unit), so named to denote its adaptivity to machine learning applications.

Figure 1:
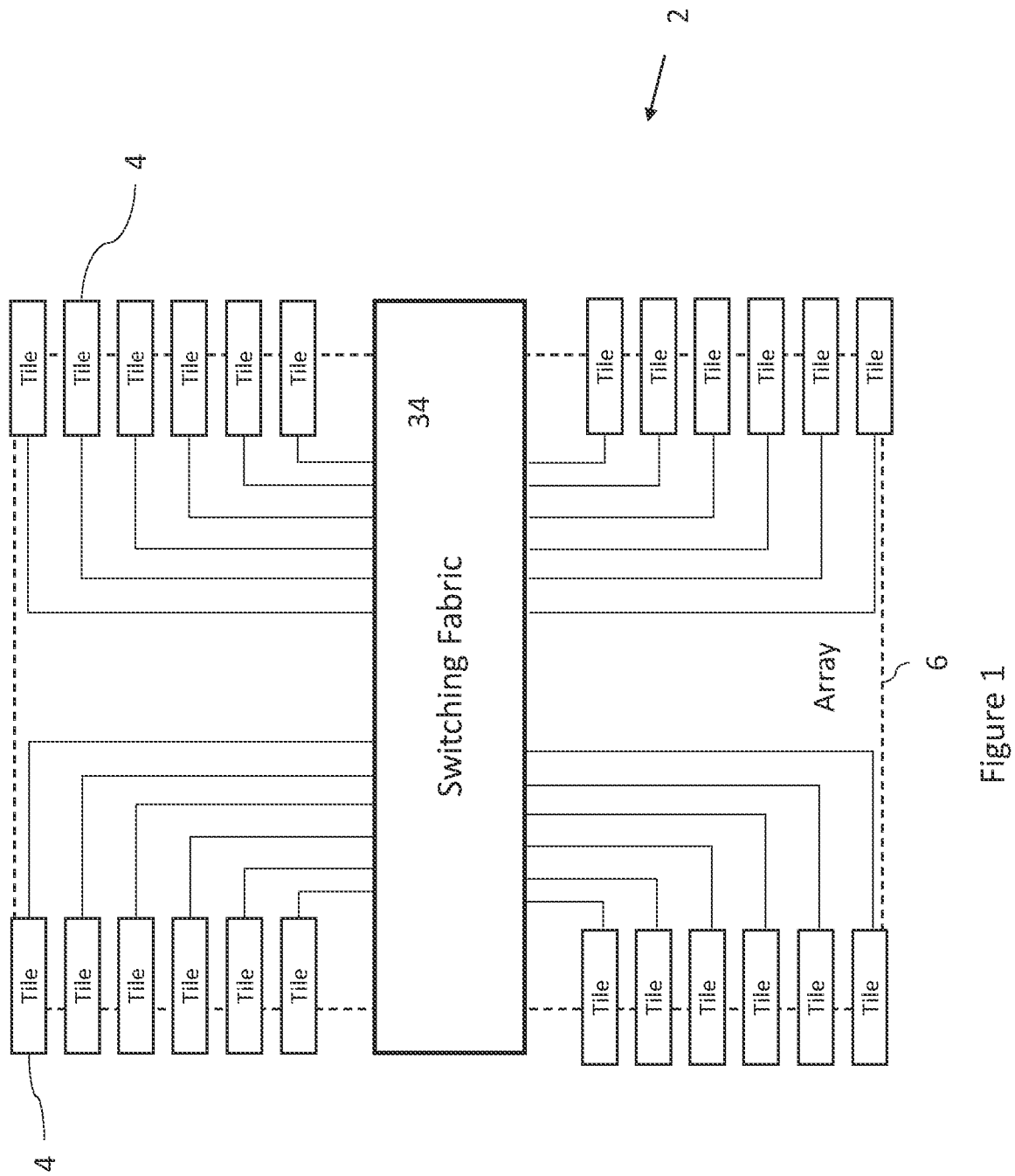
FIG. 1 illustrates a multi-tile processing unit according to embodiments of the application.

FIG. 1 illustrates schematically the architecture of the example processing unit 2. The processing unit 2 comprises an array 6 of multiple processor tiles 4 and an interconnect 34 connecting between the tiles 4. The processing unit 2 may be implemented alone or as one of multiple dies packaged in the same IC package. The interconnect 34 may also be referred to herein as the "exchange fabric" 34, as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4. Each tile 4 has its own local memory (described later). The tiles 4 do not share memory.

The processing unit 2 receives work from a host (not shown), which is connected to the processing unit 2 via one of the chip-to-host links implemented on an integrated circuit (i.e. chip) to which the processing unit 2 belongs. The work takes the form of input data to be processed by the processing unit 2. When providing the work, the host may access a computer, which comprises a single such processing unit 2 or a group of multiple interconnected processing units 2, depending on the workload from the host application.

The processing unit 2 comprises a switching fabric 34 to which all tiles 4 and links are connected by sets of connection wires, the switching fabric being stateless, i.e. having no program visible state. Each set of connection wires is fixed end to end. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), optionally with one or more valid bits. Each set of connection wires is pipelined and comprises a series of temporary stores, e.g. latches or flip flops, which hold a datum for a clock cycle before releasing it to the next store. Time of travel along each wire is determined by these temporary stores, each one using up a clock cycle of time in a path between any two points. In this way, data exchange between tiles 4 may be conducted on a time deterministic basis.

By sending data between tiles 4 in a time deterministic manner, the "packets" may be sent without destination identifiers, which would permit an intended recipient to be uniquely identified. The packets may, however, include headers indicating at least one direction of travel through the switching fabric 34.

Figure 2:
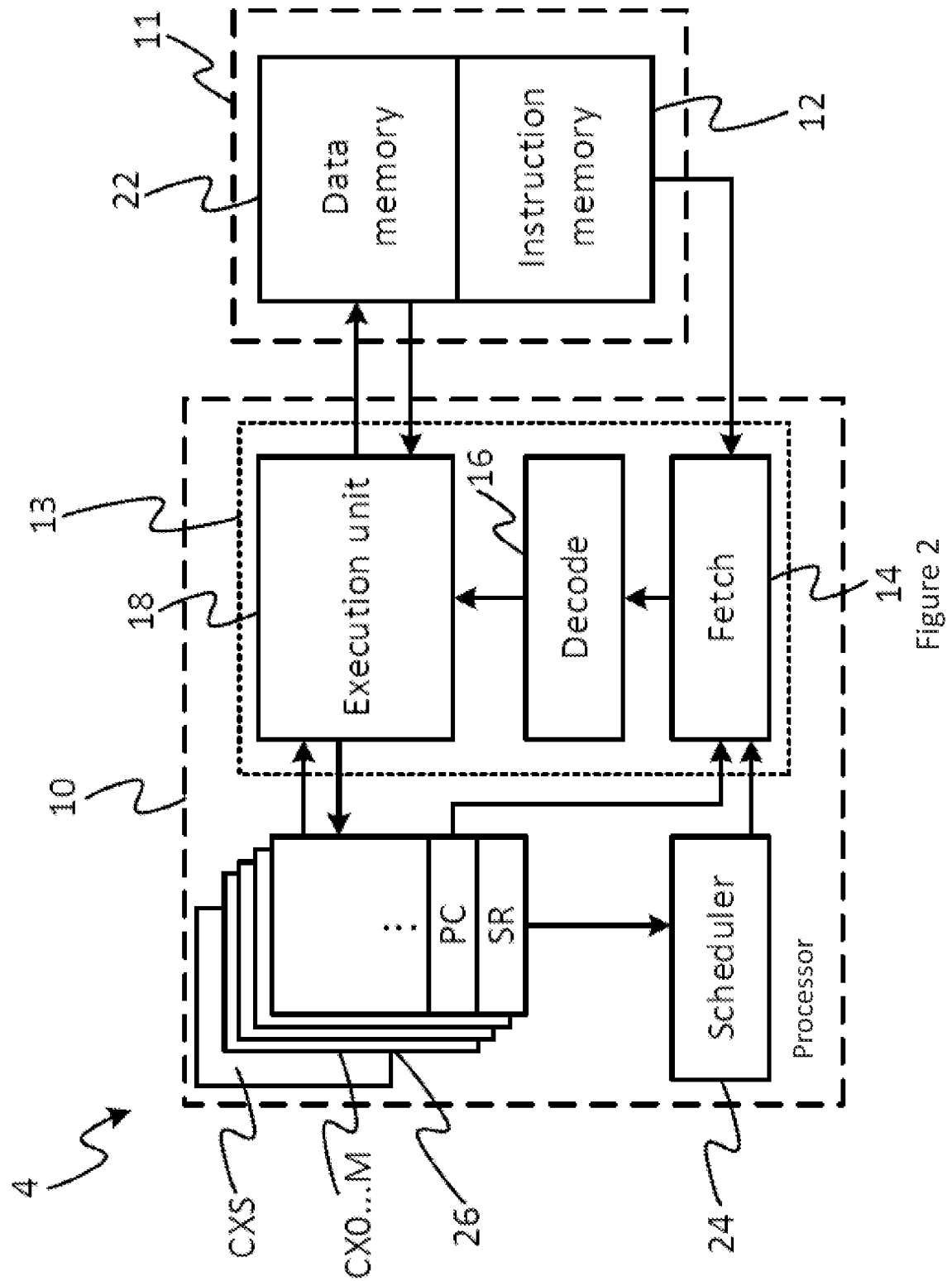
FIG. 2 illustrates an example tile processor.

Each of the processor tiles 4 comprises processing circuitry and memory. In some example embodiments, the processing circuitry is a multi-threaded processor 10. FIG. 2 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads from the instruction memory 12 can be interleaved through a single execution pipeline 13 (though typically only a subset of the total threads stored hi the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

It is desirable in some circumstances to provide for the confidentiality of data that is provided for execution on a processing unit 2. Typically, confidentiality is provided by encryption of data. One type of encryption algorithm that is useful for the encryption of large amounts of data is a block cipher encryption, which operates on fixed sized groups of data, referred to as blocks. These blocks are transported in encryption frames, which comprise one or more data packets over which the blocks are spread.

There are different types of block cipher modes of operation, and some of these make use of unique set of data referred to as an initialisation vector. The initialisation vector ensures that different encrypted data is produced from the same unencrypted data by the encryption algorithm. This has the advantage of preventing an attacker from being able to identify patterns in encrypted data.

Figure 3:
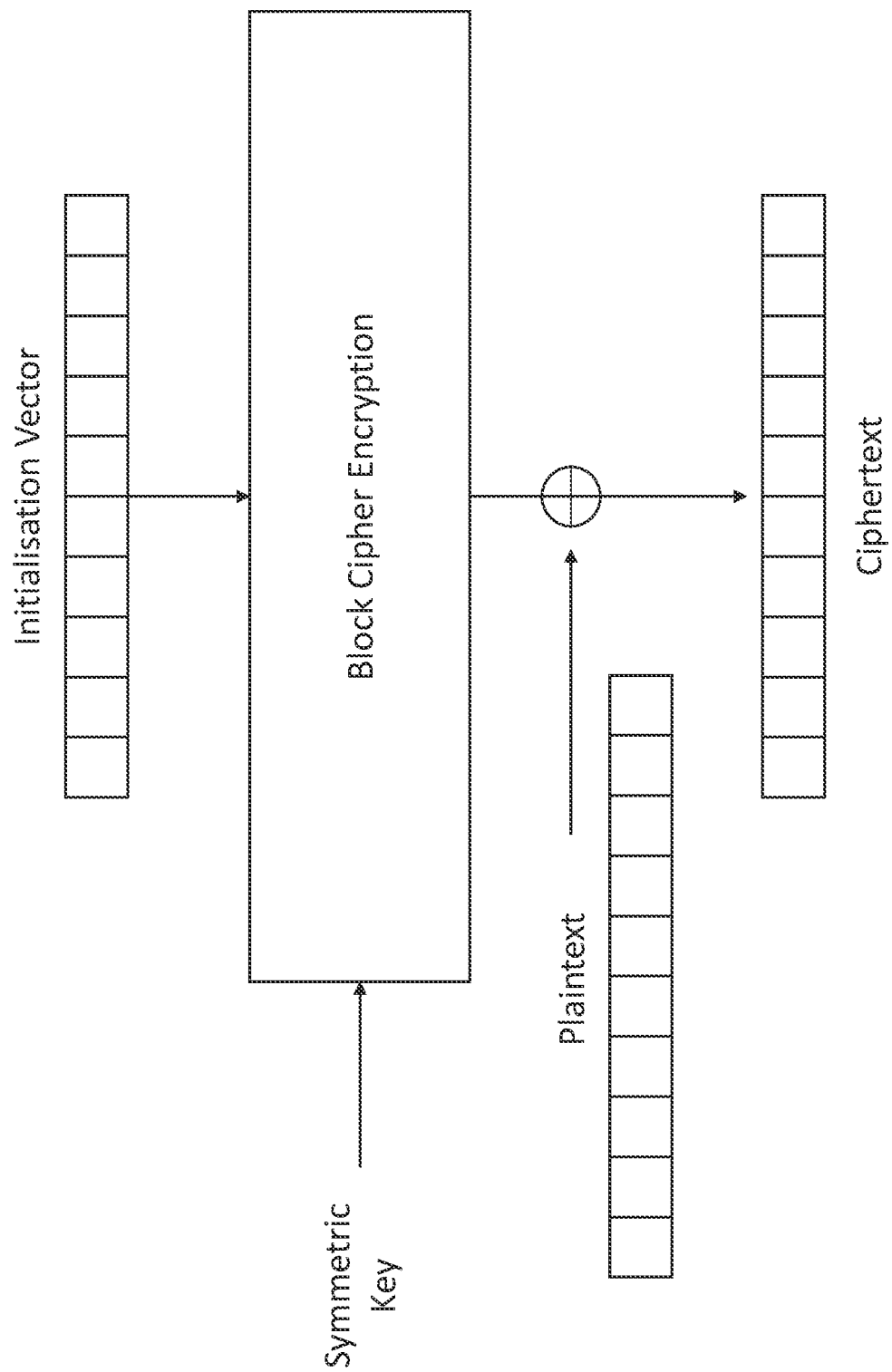
FIG. 3 illustrates an example of a block cipher mode of operation for encrypting data, which may be used for providing a TEE.

An initialisation vector may be applied in different ways to produce encrypted data. Reference is made to FIG. 3, which illustrates one example of the use of an initialisation vector. A block of unencrypted data is referred to as a block of plaintext, whereas a block of encrypted data is referred to as a block of ciphertext. As may be observed from FIG. 3, the encryption key is not directly applied to the plaintext. Rather, it is the initialisation vector that is encrypted using the encryption key. The encryption key is a symmetric key. The encrypted initialisation vector is then XORed with the plaintext to produce the ciphertext. A different initialisation vector is used in this manner to encrypt each different block of plaintext, thereby hiding patterns in the original data.

Because of the symmetry of the operation shown in FIG. 3, the decryption algorithm is the same as the encryption algorithm. In other words, to obtain the plaintext from the ciphertext, the ciphertext is XORed with the encrypted form of the initialisation vector to obtain the plaintext.

Although FIG. 3 shows an example where the encrypted form of the initialisation vector is XORed with the plaintext, other block cipher modes of operation making use of an initialisation vector may be employed. For example, in another mode of operation, the plaintext may first be XORed with the initialisation vector. The result of the XOR operation then being encrypted using the encryption key to produce the ciphertext.

There are different types of encryption algorithm that may be applied to encrypt data, such as the initialisation vector, as part of block cipher encryption. One widely used standard for performing this encryption is the Advanced Encryption Standard (AES).

Therefore, block ciphers provide for effective encryption of large amounts of data. As well as providing a set of encrypted data, in order to ensure integrity and authentication of data, a sender may also provide, along with the encrypted data, a message authentication code (MAC). This MAC may be calculated using the ciphertext or plaintext and allows a recipient to determine the sender of the data and to detect any changes to the data.

Figure 4:
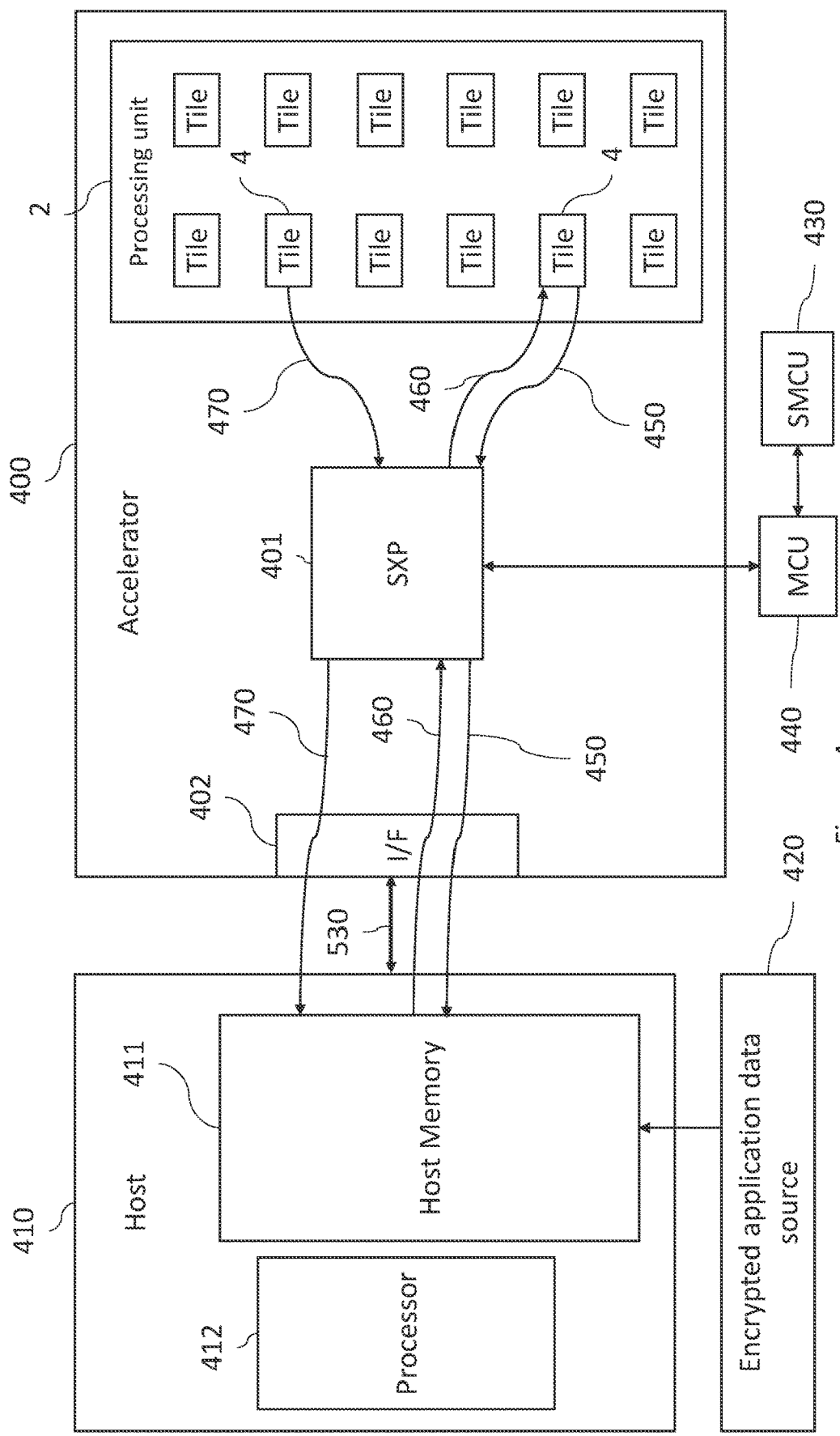
FIG. 4 is a schematic diagram illustrating the communication between processors of the accelerator subsystem and a host system.

Reference is made to FIG. 4, which illustrates how an encryption unit 405 may be used to form a local TEE on the accelerator subsystem 400. The accelerator 400 is an integrated circuit (i.e. a chip). In this example, the accelerator subsystem 400 comprises a multi-tile processing unit 2. However, in other embodiments, the accelerator subsystem 400 may be implemented with only a single processor 4.

The tiles 4 are configured to read data from and write data to a host memory 411 of a host system 410 external to the device 400. The host system 410 is untrusted and is unable to decrypt the application data stored in its memory 411.

The host system 410 is connected to a data source 420. The application data source 420 is a further data processing system that is configured to communicate with the processors 4 via the host system 410. The application data source 420 is trusted. The application data source 420 provides the compiled executable code that executes on the tiles 4 by writing this code in encrypted form to the host memory 411. It is also the data source 420 that provides application data for processing by the processing unit 2 by storing that data in the host memory 411. This data is read by the tiles 4 of the processing unit 2. Additionally, the tiles 4 write their results of processing to the host memory 411. Since the host system 410 is untrusted, the application data and the results are encrypted before being stored in the host memory 411.

The one or more symmetric keys, which are required to encrypt and decrypt the data, are shared between the application data source 420 and the accelerator 400. The host 410 is untrusted and does not have access to these keys. The symmetric keys are sent from the application data source 420 to the accelerator 400 using a secure exchange protocol. According to one such example of a secure exchange protocol, the symmetric keys are encrypted using a public key that is part of a public-private key pair. The corresponding private key is stored in a root of trust 430 associated with the accelerator 400, which is configured to obtain the symmetric key using its private key when it receives the encrypted form of the symmetric key from the application data source 420.

The root of trust 430 is responsible for controlling the operations performed to create, launch, and terminate a TEE on the accelerator 400. The root of trust 430 is a hardware module comprising processing circuitry for performing these tasks. The processing circuitry may be a processor for executing computer readable instructions held in a memory of the root of trust 430. In the example shown in FIG. 4, the root of trust 430 communicates with the accelerator 400 via a further unit 440. The root of trust 430 issues a command to the unit 440, which is configured to control the operation of the accelerator 400 in response to the commands issued by the root of trust 430. The relationship between the root of trust 430 and the associated unit 440 is not important. In some embodiments, operations described below as being performed by the root of trust 430 may be implemented using unit 440, with the units together functioning as a single root of trust.

In some embodiments, instead of providing the root of trust 430 separately to the accelerator 400, the root of trust 430 may be provided on the accelerator chip 400 and may directly control operations of the accelerator subsystem 400.

On start-up of the chip 410, an autoloader hardware module (not shown in FIG. 4) on the integrated circuit 710 issues writes at runtime to write bootloader code (referred to as a secondary bootloader) to the tiles 4. In this way, all of the tiles 4 are initially loaded with the secondary bootloader that is used to issue read requests to load the executable application code from the host memory 411 into the tiles 4. Once loaded with the secondary bootloader, the tiles 4 execute instructions of the secondary bootloader to issue requests to read the executable application code from host memory 411. Once the executable application code has been loaded into the tiles 4, each of the tiles 4 executes instructions of the application code to read application data from the host memory 411, perform processing using that application data, and write results of processing to the host memory 411. In this way, there is an exchange of data between tiles 4 and host memory 411.

In order to protect the confidentiality of data (including the application code and the application data on which operations are performed when the code is executed) that is read into the tiles 4, the data may be encrypted when stored in the host memory 411. An encryption unit 401, which is referred to as a secure exchange pipeline (SXP) 401, performs decryption operations on data read from host memory 411 into memory of the tiles 4. FIG. 4 illustrates a read request 450 dispatched from a tile 4. The read request 450 comprises an address in host memory 411 from which data is to be read. The read request 450 is dispatched via an interface controller 402 over a link 530 to the host 410. The interface controller 402 may be a PCIe controller 402. The host 410 in response to receipt of the read request 450, returns one or more read completions 460 comprising the data read from the host memory 411 at the identified addresses. This data is encrypted data and may take the form of one or more ciphertext blocks. The read completions 460 are received at the SXP 401, which performs decryption operations using a key stored in the SXP 401.

The SXP 401 also performs encryption operations for the data written to the host memory 411 from the tiles 4. This protects the confidentiality of the results of the processing performed by the tiles 4. FIG. 4 illustrates one or more write requests 470 dispatched from a tile 4. The write requests 470 each comprise an address in host memory 411 to which data is to be written. The write requests 470 are received at the SXP 401, which causes the unencrypted data in the write requests 470 to be encrypted. Encrypting the data may comprise generating one or more ciphertext blocks from one or more plaintext blocks contained in the write requests 470. The write requests 470 having the encrypted data are then dispatched via interface controller 402 over the link 530 to the host 410, The host 410 causes the encrypted data to be written to the locations in host memory 411 indicated in the write requests 470.

Although only one SXP 401 is shown in FIG. 4, in embodiments, there may be multiple SXPs 401, with separate SXPs 401 being provided for reading and writing of data by the tiles 4.

By encrypting and decrypting data in the manner discussed above, the SXP 401 ensures that data processed by the tiles 4 is processed in a trusted execution environment, where the confidentiality of that data is protected.

The root of trust 430 is responsible for managing the creation and termination of the TEE provided on the accelerator 400. The root of trust 430 is able to install one or more keys in the SXP 401 when creating the TEE. The keys installed in the SXP 401, which are symmetric keys, may be exchanged between the encrypted application data source 420 and the root of trust 430 using a secure exchange protocol, such as an asymmetric key encryption algorithm as described. The root of trust 430 is also operable to cause the wiping of the state in the SXP 401, including the keys, so as to terminate the TEE provided on its associated accelerator 400.

Figure 5:
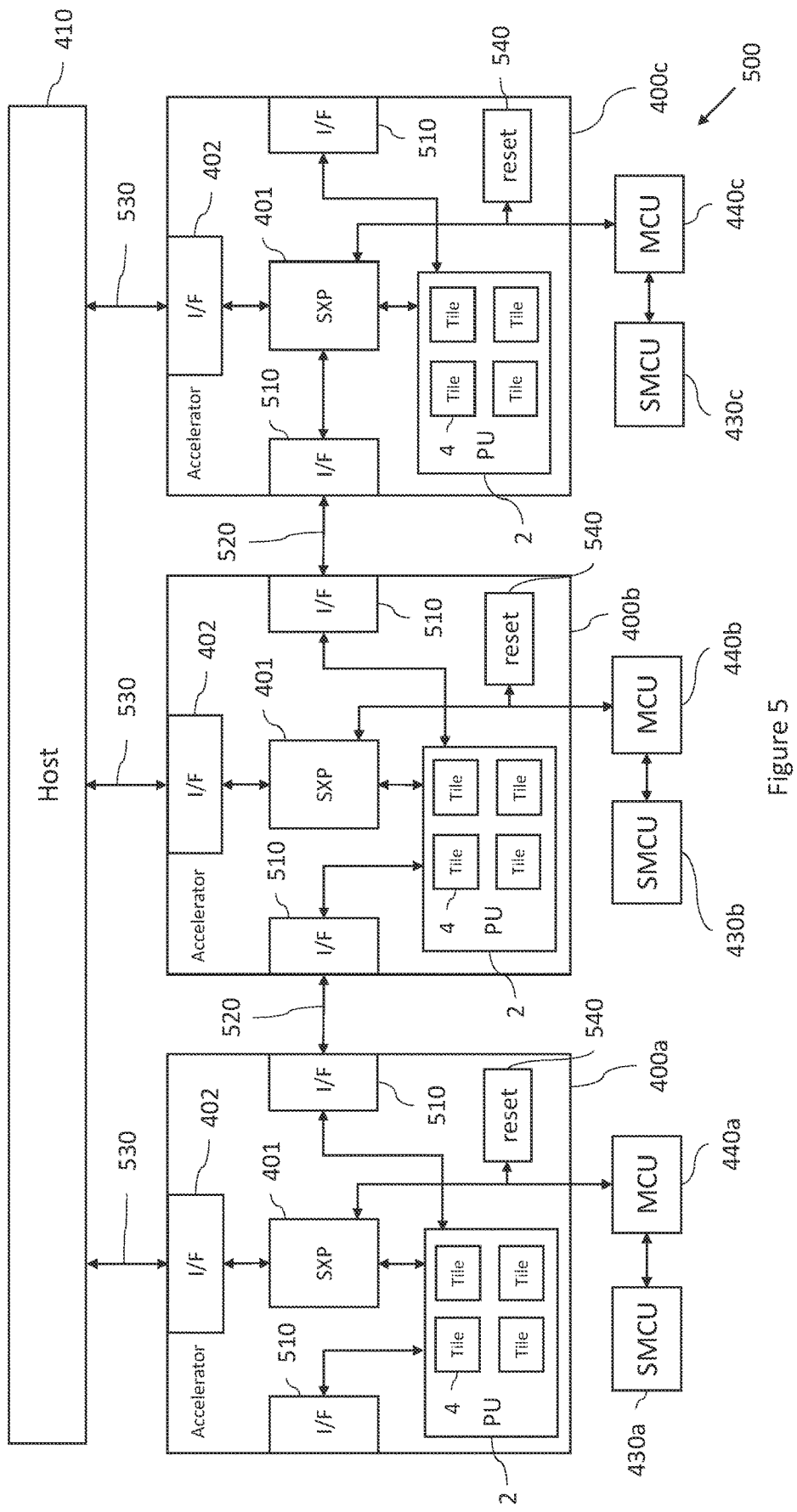
FIG. 5 illustrates a system comprising a plurality of accelerators over which is provided a distributed TEE.

In order to increase the processing capacity for processing workloads received from the host 410, a plurality of such accelerators 400 may be connected together. Reference is made to FIG. 5, which illustrates a system 500 comprising a plurality of connected accelerators 400a, 400b, 400c (collectively referred to as accelerators 400) for processing sensitive application data received from the host 410. Each of the accelerators 400 is configured to read and write data to and from the host 410 in the manner described with respect to FIG. 4. Although FIG. 5 shows a one to one mapping between the root of trust modules 430 and the accelerators 400, in some embodiments, each root of trust 430 may be shared between two or more accelerators 400 with which it is associated. In this case, each root of trust 430 is configured to perform its operations for both of its associated accelerators 400.

Each of the accelerators 400 has interface controllers 510 for communicating over links 520 with other accelerators 400. Data is sent from a tile 4 on one accelerator 400 to a tile 4 on another accelerator 400 over links 520 in unencrypted form.

Although only one SXP 401 is shown in each accelerator 400 in FIG. 5, in embodiments, separate SXPs 401 may be provided for sending data to the host 410 and reading data from the host 410.

Data is, therefore, encrypted whenever it is output from an accelerator 400 to the host 410. In this way, a distributed TEE is enforced across the system 500 of accelerators 400, since it is not possible for a third party to access the data processed by the accelerators 400.

The term "distributed TEE" may be taken to refer to the TEE provided across the system of accelerators 400. The term "local TEE" may be taken to refer to the part of that distributed TEE that is provided on a single accelerator 400.

As noted, in some circumstances it may be desirable to terminate the distributed TEE. Termination may be required because the processing of a workload has completed, the host 410 has a firmware upgrade to deploy, or one of the accelerators 400 encounters an unrecoverable error condition or a power failure. Terminating the distributed TEE presents a risk that the sensitive data held in the accelerators 400, which is normally protected by the encryption performed by the SXPs 401, will be accessible to a third party.

A first method is provided for terminating the distributed TEE without exposing the sensitive data processed by the accelerators 400 to a potential attacker. According to this first method, the memory of the tiles 4 of a plurality of the accelerators 400 is first wiped. Confirmation messages are exchanged between the roots of trust 430 and the host 410 in order to provide confirmation to each of these roots of trust 430 that the memory of the tiles 4 in one or more other relevant accelerators 400 of the system 500 is erased before the method proceeds on to the next step, in which the TEE is terminated on the accelerator 400 associated with that root of trust 430.

As will be described, in some embodiments of the first method, a confirmation message may be received at a root of trust for every other accelerator 400 in the system 500. However, in other embodiments, one or more of the accelerators 400 (e.g. on which a failure condition has occurred) may not be required to send a confirmation message, since it is instead configured to unilaterally self-isolate and terminate its TEE in the manner described with respect to FIG. 9.

Figure 7:
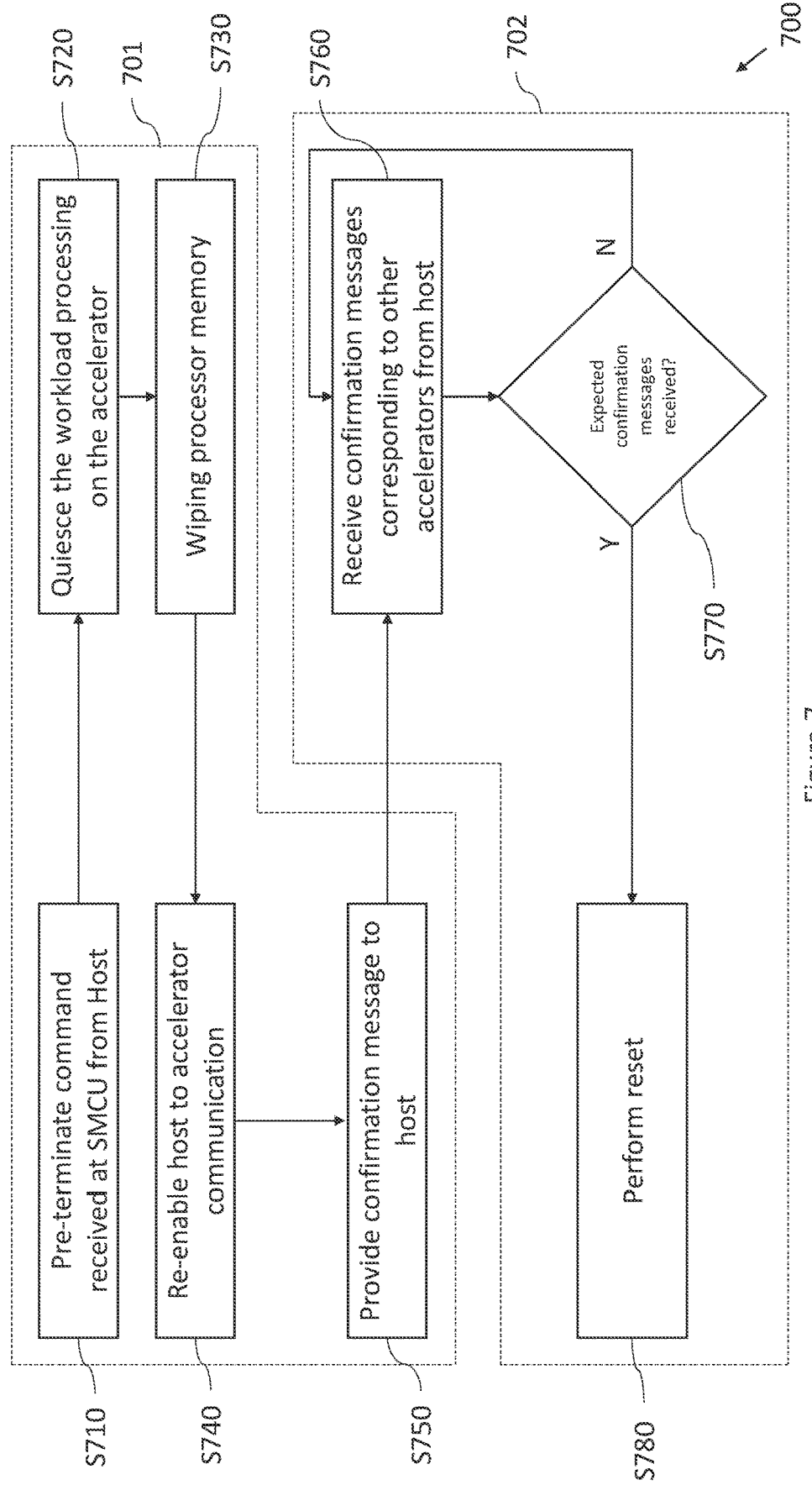
FIG. 7 is a first method for terminating a distributed TEE according to embodiments of the application.

Reference is made to FIG. 7, which illustrates steps performed in example embodiments of the first method. This method 700 may be implemented by each of the roots of trust 430 in the system 500 in which the distributed TEE is established. However, in other embodiments one or more of the roots of trust 430 may, instead of performing method 700, perform the steps of method 900 as will be described.

In the following description of method 700, the steps are described as being performed with respect to a single accelerator 400 and single root of trust 430 in the system 500. However, it would be appreciated that the steps of the method 700 are separately performed by a plurality of the roots of trust 430 in the system 500.

The method 700 is shown divided into two separate stages. The first stage 701 is known as the pre-terminate stage 701, and comprises a series of operations performed so as to ready the respective accelerator 400 for the termination of the TEE on that accelerator 400. The second stage 702 is known as the terminate stage 702 and comprises certain checks performed prior to the termination of the local TEE on the accelerator 400, in addition to the reset that causes the termination of that local TEE to be performed.

At S710, the host 410, upon determining that the distributed TEE is to be terminated, sends a command (referred to as a "pre-terminate command") to the accelerator 400. This command is routed through the accelerator 400 to the root of trust 430 associated with the accelerator 400. In response to receipt of the command, the root of trust 430 causes the method 700 to progress to S720.

At S720, the root of trust 430 ensures that the workload executing on the accelerator 400 stops running and that there is no data exchange between the accelerator 400 and the host 410. This process may be referred to as "quiescing the workload", and may include a number of steps described below.

As part of quiescing the workload, the root of trust 430 prevents the program running on the tiles 4 from moving to a further phase of execution in which further data exchange between the host 410 and the accelerator 400 takes place. In embodiments, a credit register is provided in the accelerator 400, which enforces barriers (following which data exchange with the host 410 is performed) in the execution of the program that may not be passed unless the number of credits in the register is non-zero. In order to prevent the program running on the tiles 4 from moving to a further phase of execution, the root of trust 430 issues a command to zero the number of credits in the credit register, such that the program running on the accelerator 400 may not progress past the next barrier in the execution of the program.

The process at S720 also includes blocking data exchange between the host 410 and the accelerator 400. As part of this, the root of trust 430 causes the host 410 to be prevented from having access to different storage components on the accelerator 400. This includes preventing the host 410 from sending data to the tiles 4. Preventing host access also includes preventing the host 410 from having access to configuration registers in the accelerator 400. Settings in the interface controller 402 may be set in response to a command issued by the root of trust 430 to prevent the host 410 from having such access. The settings may include settings in a command register in the interface controller 402, which cause the interface 402 to reject any host access to the tile memory and to configuration registers of the accelerator 400. The configuration registers, which the host 410 is prevented from accessing, include the credit register discussed above. Since the host 410 cannot access the credit register to refresh the credits, it is prevented from restarting the workload processing.

At S720, the root of trust 430 also issues a command to modify settings in the interface controller 402 so as to prevent the tiles 4 from sending data to the host 410. With these settings modified, the interface controller 402 will reject any data sent by the tiles 4 to the host 410.

At S720, the root of trust 430 may logically disable the links 520 between the accelerator 400 and its connected accelerators 400. By doing so, an accelerator 400 cannot access or be accessed by its connected accelerators 400 until the TEE on that accelerator 400 is terminated. Logical disablement of the links does not result in the link being torn down. Therefore, when the links 520 are re-enabled, there is no requirement for the links 520 to be retrained and re-established at the physical and link layers.

By performing the steps of S720, after a certain period of time, the workload on the accelerator 400 stops running and is said to be quiesced. Since the workload processing is cleanly quiesced in this way, then there will be no traffic in flight once S730 is reached and therefore, when the tile memory is erased at S730, it is ensured that the confidential data will be removed from the accelerator 400.

Figure 6:
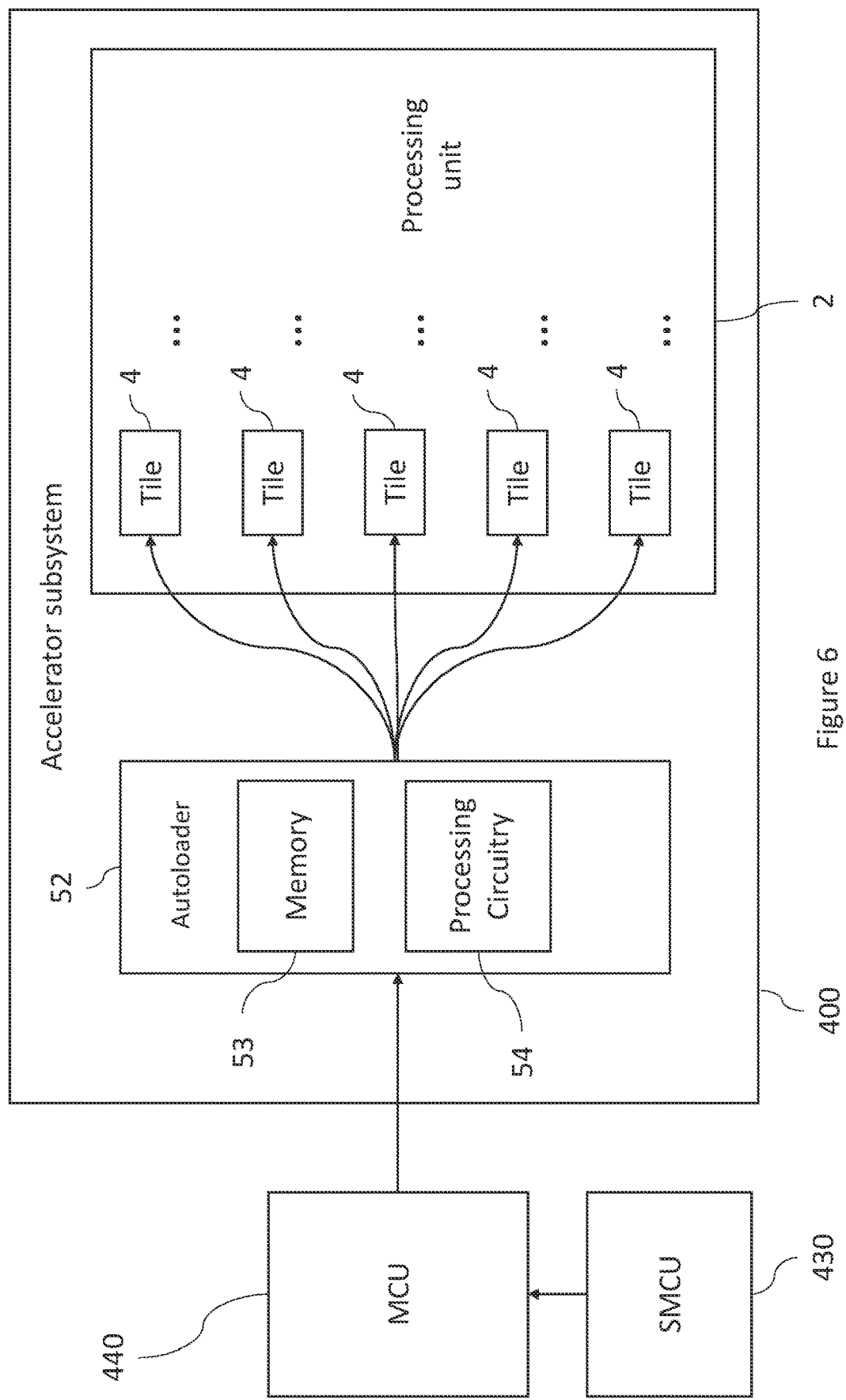
FIG. 6 is a schematic diagram illustrating the wiping of processor memory.

At S730, the root of trust 430 causes the memory of the tiles 4 to be wiped. In example embodiments, this wiping of tile memory is performed using a dedicated hardware module (not shown in FIG. 5) on the accelerator 400. Reference is made to FIG. 6, which illustrates the use of the hardware module 52 for wiping the tile memory. The hardware module 52 is the autoloader, which as described above, writes the secondary bootloader code to the tiles 4 to enable them to load the application code from the host memory 411. The hardware module 52 comprises processing circuitry 54 configured to execute instructions stored in memory 53 to perform the operations described.

When tile memory is to be wiped, the root of trust 430 sends a command to the unit 440, which causes a command to be sent to the hardware module 52 of the accelerator 400. The hardware module 52 responds by dispatching a series of data packets to each of the tiles 4. Each of the data packets comprises an address in tile memory and a payload comprising zeros to be written to the indicated address. Once the hardware module 52 has written a set of zeroes to each of the tiles 4, the module 52 then loops over the subset of tiles 4 again, this time by writing to an incremented tile address. The module 52 continues to loop over the tiles 4 until the module 52 has wiped all of the tile memory. Once the module 52 has wiped the tile memory, the module 52 sends a message to the root of trust 430 to indicate that the wiping of tile memory is complete.

The use of the hardware module 52, which is distinct from the off-chip root of trust 430, may be used for efficient wiping of the tile memory. However, in implementations where the root of trust 430 is implemented as part of the accelerator 400, the root of trust 430 may itself perform the operations described as being performed by the hardware module 52.

Following the wiping of tile memory, the method 700 proceeds to S740, at which point the communication between the host 410 and the accelerator 400 is re-enabled. This is performed by the root of trust 430 issuing a command to change at least some of the setting in the interface controller 402 that were set at S720 to block host access. By re-enabling communication between the host 410 and the accelerator 400, the host 410 may then communicate with the root of trust 430 as required for S750 and S760.

At S750, the root of trust 430 produces and provides a confirmation message to the host 410. The provision of the confirmation message to the host 410 indicates to the host 410 that the pre-termination stage 701 is complete for the accelerator 400 and, therefore, that the memory has been wiped.

A symmetric key stored in the root of trust 430 is used to generate a message authentication code (MAC) for the confirmation message so as to provide authentication of the confirmation message. Each of the roots of trust 430 in the system 500 stores the same symmetric key for authenticating the confirmation messages. The roots of trust 430 are provisioned with the symmetric key at time of launch of the distributed TEE, i.e. at the time that the accelerators 400 start executing the workload. The provision of these symmetric keys is performed using a secure exchange protocol, such as an asymmetric key distribution method. In particular, the exchange may be implemented using an ECDH-derived shared secret. The authentication of the confirmation messages using the symmetric key, prevents a malicious third party from spoofing confirmation messages. The MAC is produced by applying the symmetric key to an identifier for the accelerator 400 associated with the respective root of trust 430. In this way, the MAC provided by each root of trust 430 is different. In embodiments, the confirmation message payload is the MAC for that confirmation message. The MAC for a confirmation message may be reproduced by a party in possession of the symmetric key. The MAC may be a hash-based message authentication code (HMAC).

The root of trust 430 may be programmed with identifiers of the other accelerators 400 that it expects to receive confirmation messages for. These accelerators 400 are the neighbours of its own associated accelerator 400 (two accelerators are said to be neighbours if they are connected together over a link 520). For example, in FIG. 5, the root of trust 430b associated with accelerator 400b may expect to receive confirmation messages identifying the accelerators 400a and 400c. The root of trust 430a associated with accelerator 400a may expect to receive a confirmation message identifying the accelerator 400b. The root of trust 430c associated with accelerator 400c may expect to receive a confirmation message identifying the accelerator 400b. How many confirmation messages a root of trust 430 expects to receive may be dependent upon the topology of the system 500 and is programmed into the root of trust 430 at creation of the distributed TEE. The expected number of confirmation messages is stored in memory of the root of trust 430 as requirements for proceeding to terminate the distributed TEE. This information in memory comprises identifiers of each accelerator 400 for which the root of trust 430 expects to receive a confirmation message. The root of trust 430 applies its symmetric key to each of the identifiers of the accelerators 400 from which it expects to receive a confirmation message. By doing so, the root of trust 430 determines a set of MACs that it expects to receive. This set of MACs is stored in the root of trust's 430 memory.

At S760, the root of trust 430 receives confirmation messages associated with other roots of trust 430 of the system 500 from the host 410. The host 410 distributes these confirmation messages upon receiving them at S750. The host 410 distributes each of the confirmation messages in a terminate command. The host 410 may distribute each confirmation message it receives from a root of trust 430 only to that root of trust's neighbouring roots of trust 430. A root of trust 430 is said to be a neighbour of another root of trust 430 if the associated accelerators 400 of those roots of trust 430 are connected together over a link 520. For example, in FIG. 5, root of trust 430a is a neighbour to root of trust 430b. Root of trust 430b is a neighbour to root of trust 430a and root of trust 430c. Similarly two accelerators 400 may said to be neighbours if they are connected together over a link 520. A neighbouring accelerator may also be referred to as connected accelerator.

When it receives a confirmation message, the root of trust 430 checks the MAC in the confirmation message against the set of MACs that it expects to receive. If the MAC of the confirmation message matches one of the MACs that the root of trust 430 expects to receive, then the confirmation message is determined to be a valid confirmation message.

The root of trust 430 performs these steps at S760 for each of the predefined number of accelerators 400 from which it expects to receive confirmation messages.

Figure 8A:
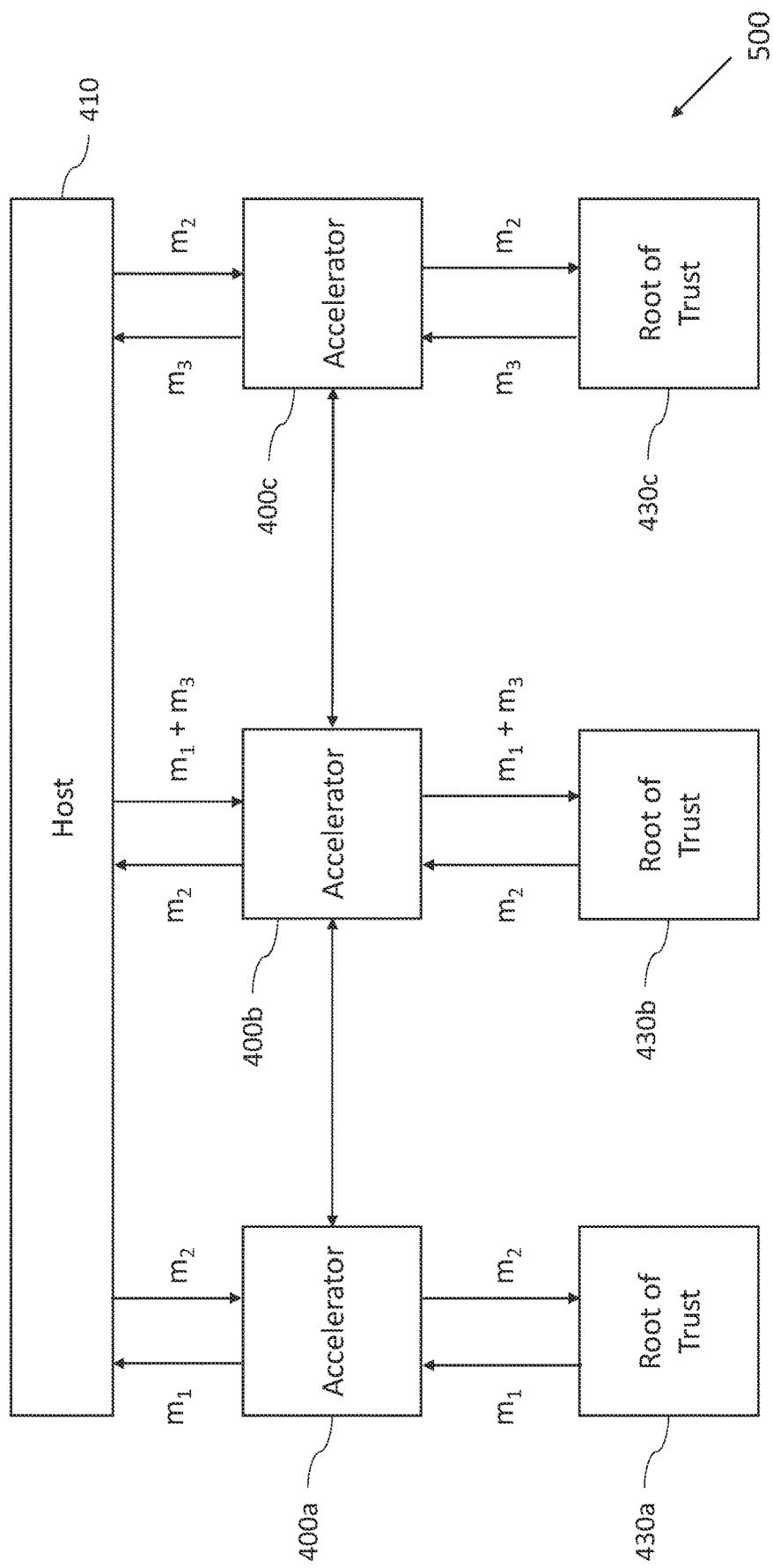
FIG. 8A is a schematic diagram illustrating the exchange of confirmation messages between the host system and the accelerators.

To illustrate the exchange of confirmation messages performed at S750 and S760 in more detail, reference is made to FIG. 8A, which illustrates the exchange of confirmation messages in the system 500 according to an example embodiment.

Once it reaches S750, the root of trust 430a sends its confirmation message, $m_1$, via its associated accelerator 400a to the host 410. Similarly, once it reaches S750, the root of trust 430b sends its confirmation message, $m_2$, via its associated accelerator 400b to the host 410. Once it reaches S750, the root of trust 430c sends it confirmation message, $m_3$, via its associated accelerator 400c to the host 410.

At S760, the host 410 then sends a terminate command to each of the roots of trust 430. When it does so, the host 410 includes in each terminate command, the confirmation messages that it received from the roots of trust 430 that are adjacent to the root of trust 430 to which the respective confirmation message is delivered. For example, as part of S760, the host 410 passes a terminate command with message, $m_2$, to root of trust 430a, such that root of trust 430a receives a confirmation message ($m_2$) from its neighbouring root of trust 430b. Also, the host 410 passes a terminate command with confirmation messages, $m_1+m_3$, to root of trust 430b, such that root of trust 430b receives a confirmation message ($m_1$) from its neighbouring root of trust 430a and a confirmation message ($m_3$) from its neighbouring root of trust 430c. Also, the host 410 passes a terminate command with message, $m_2$, to root of trust 430c, such that root of trust 430c receives a confirmation message ($m_2$) from its neighbouring root of trust 430b.

At S770, the root of trust 430 determines whether it has received and verified all of the confirmation messages in accordance with its stored requirements. This step comprises determining whether the root of trust 430 has received confirmation messages from all its neighbouring roots of trust 430. To determine this, the root of trust 430 compares the MACs (which are derived from the identifiers of the accelerators 400) stored in its memory with the MACs contained in confirmation messages that it receives. The root of trust 430 determines that it has received the confirmation messages required to proceed to S780 when it has received confirmation messages comprising each of these MACs stored in its memory.

In embodiments, a root of trust 430 may only be required to receive confirmation messages from its neighbours, since the links 520 between the accelerators 400 are disabled at S720. With the links 520 disabled prior to completion of the pre-termination stage 701, it may be guaranteed that an accelerator 400 cannot communicate with any other accelerators 400 in the system 500 that have not yet completed the pre-termination stage 701, including the wiping of tile memory. In other embodiments, the links 520 may not be disabled, with a requirement instead that, prior to termination, confirmation messages must be received from every other accelerator 400 in the system 500. In these embodiments, the host 410 is configured to, at S750, provide to each root of trust 430, confirmation messages from every other root of trust 430 in the system 500.

If the root of trust 430 has not received all of the confirmation messages after a certain time, the root of trust 430 sends a packet indicating an error to the host 410. In response, the host 410 will re-send a pre-terminate command to the accelerators 400 from which it has not yet received a confirmation message. It will then wait until it has received the missing confirmation messages and then send one or more new terminate commands with those missing confirmation messages.

Once the root of trust 430 has received all of the expected confirmation messages—which indicate that all of its neighbouring roots of trust 430 have completed the pre-terminate stage 701 and have therefore wiped their tile memory—the method advances to S780.

At S780, the root of trust 430 causes its associated accelerator 400 to be reset. This reset, which may be referred to as a software reset, resets the state of a plurality of components that are part of the accelerator 400. As part of this reset, the SXP 401 is reset. The reset of the SXP 401 erases the stored one or more keys from the SXP 401 and any context state used for processing specific encryption frames. The reset of the SXP 401 has the effect of terminating the TEE since, following such a reset, the SXP 401 will no longer be in a state to encrypt and decrypt data passing between the tiles 4 and the host 410. State within the root of trust 430 is also erased by the reset, including any of the encryption keys used by the SXP 401 that are stored in the root of trust 430. In order to securely process a workload again, a new TEE will need to be created including the provision to the accelerator 400 of the one or more keys required by the accelerator for performing its required encryption/decryption operations.

The reset performed at S780 may leave some of the state in the accelerator 400 without clearing it. The reset does not clear the tile memory, which was separately cleared at S730. The reset does not clear the state in the interfaces 402, 510. State is therefore retained in the interface 402, and in the PHY for the host links 530 and the accelerator links 520. Retaining this state allows communication over the links 520, 530 to resume following the reset at S780, without requiring the retraining of the links 520, 530.

To perform the reset at S780, the root of trust 430 issues a reset command to its accelerator 400. As shown in FIG. 5, each accelerator 400 comprises a reset register 540, which is configured to receive a reset signal in response to issuance of a reset command by the root of trust 430 associated with the accelerator 400. Each accelerator 400 comprises dedicated wiring connecting the reset register 540 to the components that are reset by the reset at S780. When the reset register 540 receives the signal issued by the root of trust 430, the reset register 540 propagates that signal to the components, including the SXP 401, to cause the state of those components to be reset at S780.

Following the reset, the links 520, 530 may again be re-enabled. Given that the tile memory of the connected accelerators 400 has been wiped, this does not present a security risk. To enable the host 410 to create a new TEE, the root of trust 430 causes host access to configuration registers in the interface 402 to re-enabled, allowing the host 410 to issue commands over the interface 402 for future TEE establishment.

As noted, in some circumstances, the distributed TEE may be terminated in response to a failure condition occurring on one of the accelerators over which the distributed TEE is established. In order to manage this case, according to embodiments of the first method, the accelerator 400 on which a failure occurs may be configured to self-isolate and unilaterally reset, with the remaining accelerators then performing the method 700.

Reference is made to FIG. 9, which illustrates a method 900 that may be performed in response to a failure condition occurring on an accelerator 400. The method 900 is performed prior to method 700 being performed by the other accelerators 400 in the system 500.

In the following description of the method 900, an example is described in which a failure condition has occurred on accelerator 400c. However, it would be understood by the skilled person that the teaching equally applies to scenarios where failure conditions occur on any other ones of the accelerators 400. In some cases, the accelerator 400 on which a failure condition occurs may be connected to a plurality of accelerators 400 (rather than only the single accelerator 400b), in which case the steps (S940 and S950) of method 900 described as being performed by accelerator 400b, will be performed by each of those plurality of connected accelerators 400.

At S910, the accelerator 400c encounters a failure condition. This failure condition could be associated with various different components of the accelerator 400c and is detected by hardware of the accelerator 400c. The indication of the failure condition is propagated to the root of trust 430c associated with the accelerator 400c, with the root of trust 430c causing the accelerator 400c to self-isolate in response to the indication of the failure condition.

The self-isolation may be achieved by the root of trust 430c first causing an error message to be propagated over the links 520 to a connected accelerator 400b, and then for those links 520, along with the accelerator's 400c link 530 to the host 410, to be logically disabled. Alternatively, the self-isolation may be achieved by the root of trust 430c erasing all of the state associated with the links 520, 530 held in the interface controllers 402, 510 such that the links are disabled. In either case, the connected accelerator 400b will detect that the links are disabled.

At S920, the root of trust 430b associated with the accelerator 400b connected to the failed accelerator 400c determines that a failure has occurred on the accelerator 400c. A root of trust 430b may make this determination in response to receipt of the error message at its accelerator 400b. In this case, the error message is passed to the connected module 440b, which informs the root of trust 430b of the error. Alternatively, the root of trust 430b may make the determination in response to the link 520 being disabled. In this case, the interface controller 510, which the accelerator 400b uses to interface with the failed accelerator 400c, detects that the link 520 is not functional in response to determining that keep-alive packets used to maintain link alignment for the link 520 may not be transmitted and received over the link 520. In response to making such a determination, the interface 510 causes an interrupt to be sent to the module 440b. The module 440b then notifies the root of trust 430b that the link 510 is disabled.

In response to determining that the failure condition has occurred on the neighbouring accelerator 400c, the root of trust 430b issues a command to cause the interface controller 510 on accelerator 400b to disable the link 520 with the failed accelerator 400c. This prevents the faded accelerator 400c from unilaterally re-enabling the link 520, since the link 520 has then been disabled at both ends, i.e. at both interface controllers 510. The disabling of the link 520 by interface controller 510 on accelerator 400b comprises this interface controller 510 rejecting any traffic received from the accelerator 400c.

At S930, after having performed the self-isolation, the memory of the accelerator 400c on which the failure occurred is wiped. This is performed in the same way as described above for S730, i.e. either by the root of trust 430c transmitting a command to the hardware module 52 causing the hardware module 52 to write zeroes to the memory of the accelerator 400c, or by the root of trust 430c wiping the tile memory itself. The root of trust 430c further causes the TEE on the accelerator 400c to be terminated by issuing a command for a reset as in S780 described above. Since the accelerator 400c is isolated from accelerator 400b by the disabling of the link 520 by the accelerator 400b (such that accelerator 400c may not unilaterally re-enable the link 520), termination of the TEE on accelerator 400c may be performed without presenting a security risk of exposing the data held in the memory of accelerator 400b.

At S940, the root of trust 430b dispatches a notification to the host 410 to inform the host 410 of the failure of accelerator 400c and, therefore, of the requirement to terminate the distributed TEE across the system 500.

At S950, the root of trust 430b reduces the number of confirmation messages that it expects to receive at S760. Since the failed accelerator 400c self-isolates and resets without a command from the host 410, it does not transmit a confirmation message. Therefore, the root of trust 430b will not receive a confirmation message corresponding to the failed accelerator 400c. The step S950 comprises updating an indication in memory of the threshold number of confirmation messages required to be received prior to progressing to S780, The root of trust 430b updates the stored indication such that a confirmation message associated with accelerator 400c is not required before progressing to S780.

After S950, the method 700 is performed. The method 700 is performed with respect to each of the accelerators 400a, 400b, other than accelerator 400c, in the system 500. S710 is performed by the host 410 in response to receipt of the message (at S940) indicating failure of the accelerator 400c. The method 700 is performed by the other accelerators 400a, 400b as described above with, however, the difference that, in this case, the accelerator 400b does not require a confirmation message from the failed accelerator 400c before proceeding to the reset step at S780.

Figure 8B:
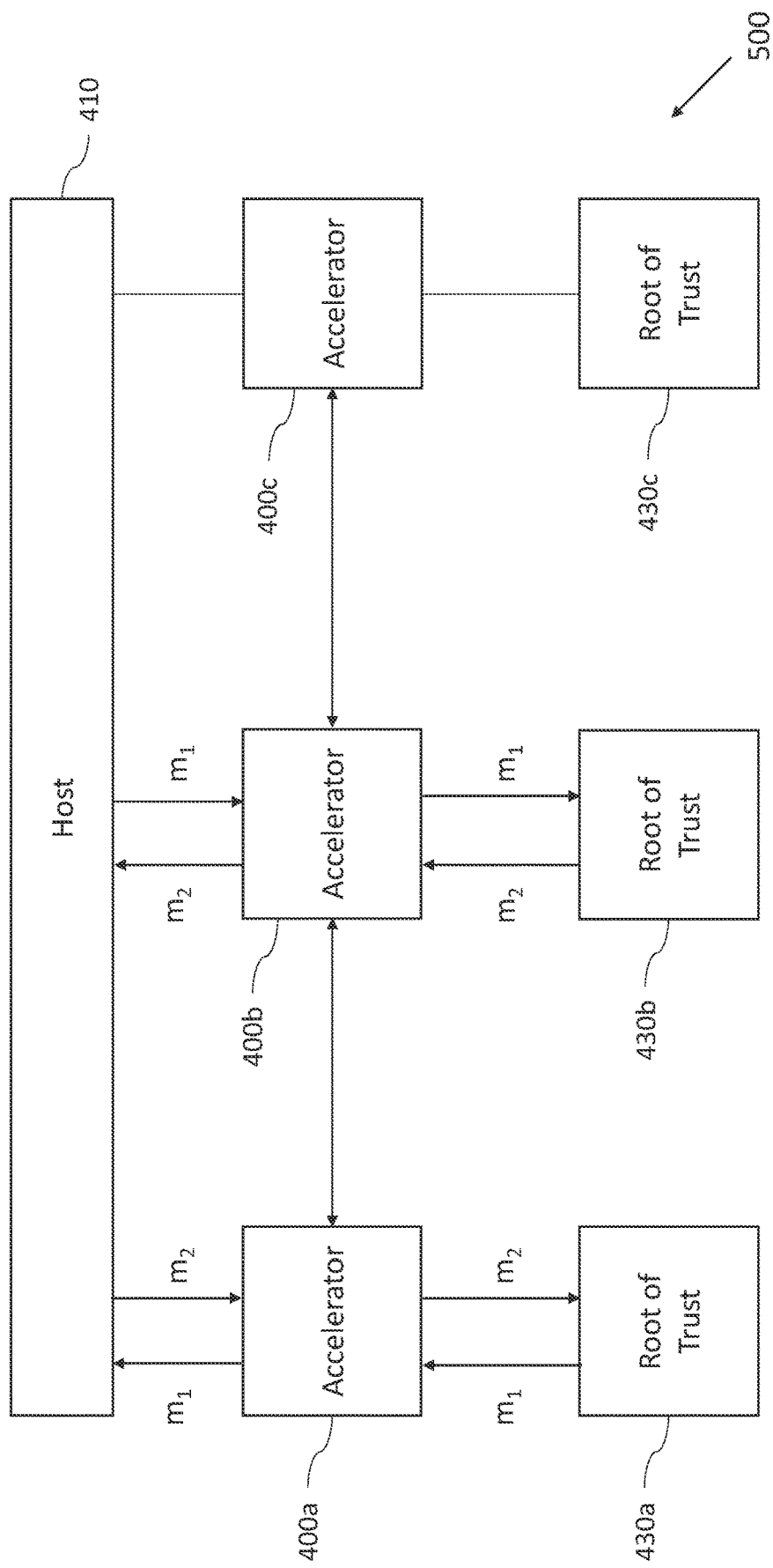
FIG. 8B is a schematic diagram illustrating the exchange of confirmation messages between the host system and the accelerators in the case that one of the accelerators has failed.

Reference is made to FIG. 8B, which illustrates the exchange of confirmation messages between entities in the system 500, in the case that the accelerator 400c has encountered a failure condition. In this case, the root of trust 430c does not send any confirmation messages. The root of trust 430a send its confirmation message, $m_1$, which is received by the root of trust 430b. The root of trust 430b sends its confirmation message, $m_2$, which is received by the root of trust 430a. Root of trust 430a will advance to terminate the TEE on accelerator 400a after having received the confirmation message $m_2$. Since the root of trust 430b determines that accelerator 400c has reached a failure condition, it does not wait to receive a confirmation message associated with accelerator 400c, but proceeds to terminate the TEE on accelerator 400b after receiving the confirmation message, $m_1$.

In order for communication between the accelerator 400b and the failed accelerator 400c to resume, both of the interface controllers 510 are required to initiate re-enabling of the link 520. The root of trust 430c of the failed accelerator 400c initiates this re-enabling of the link 520 following the reset at S930. The root of trust 430b of the accelerator 430b initiates re-enabling of the link 520 following the reset at S780, When the link 520 is re-enabled following both of the roots of trust 430b, 430c initiating re-enabling of the link 520, both of the accelerators 400b, 400c have undergone the processes of wiping their tile memory and terminating the TEE, such that re-enabling the link 520 between them does not present a threat to security.

In some embodiments, the steps S910 to S950 may be performed in response to a power failure in the event of an operation that resets the root of trust 430c. In the event of an operation that resets this root of trust 430c, the reset is coupled with an operation that causes the link 520 to the accelerator 400b to be disabled (and the neighbouring root of trust 430b to be informed) at S920. Once the root of trust 430c comes out of reset, it wipes out tile memory of accelerator 400c at S930 before any retraining of link 520 is complete, so as to ensure that the contents of the memory of the accelerator 400c are not accessible to the host 410 or to a malicious application running on the connected accelerator 400b.

A second method for terminating the distributed TEE will now be described. The second method involves each accelerator subsystem 400 self-isolating prior to termination of the TEE on the respective accelerator 400. The tile memory is also wiped prior to re-enabling the respective accelerator's links to other accelerators 400 in the system. By having each accelerator 400 self-isolate at the start of the process for terminating the distributed TEE, it is not possible for a malicious third party to access the sensitive data held in that accelerator 400 via a neighbouring accelerator 400 on which the TEE has already terminated, since any accelerators 400 on which sensitive data may still be stored will not be accessible from an accelerator 400 on which the TEE has been terminated.

The second method is implemented by processing circuitry associated with the accelerator subsystem 400. This processing circuitry may belong to a root of trust 430 associated with the accelerator subsystem 400. Additionally or alternatively, the processing circuitry may be implemented in a different component, which is part of the accelerator subsystem 400 itself. In some embodiments, the described processing circuitry may be distributed between different modules, e.g. part of the processing circuitry may belong to the root of trust 430 and part may belong to a different component, which is part of the accelerator subsystem 400.

Figure 10A:
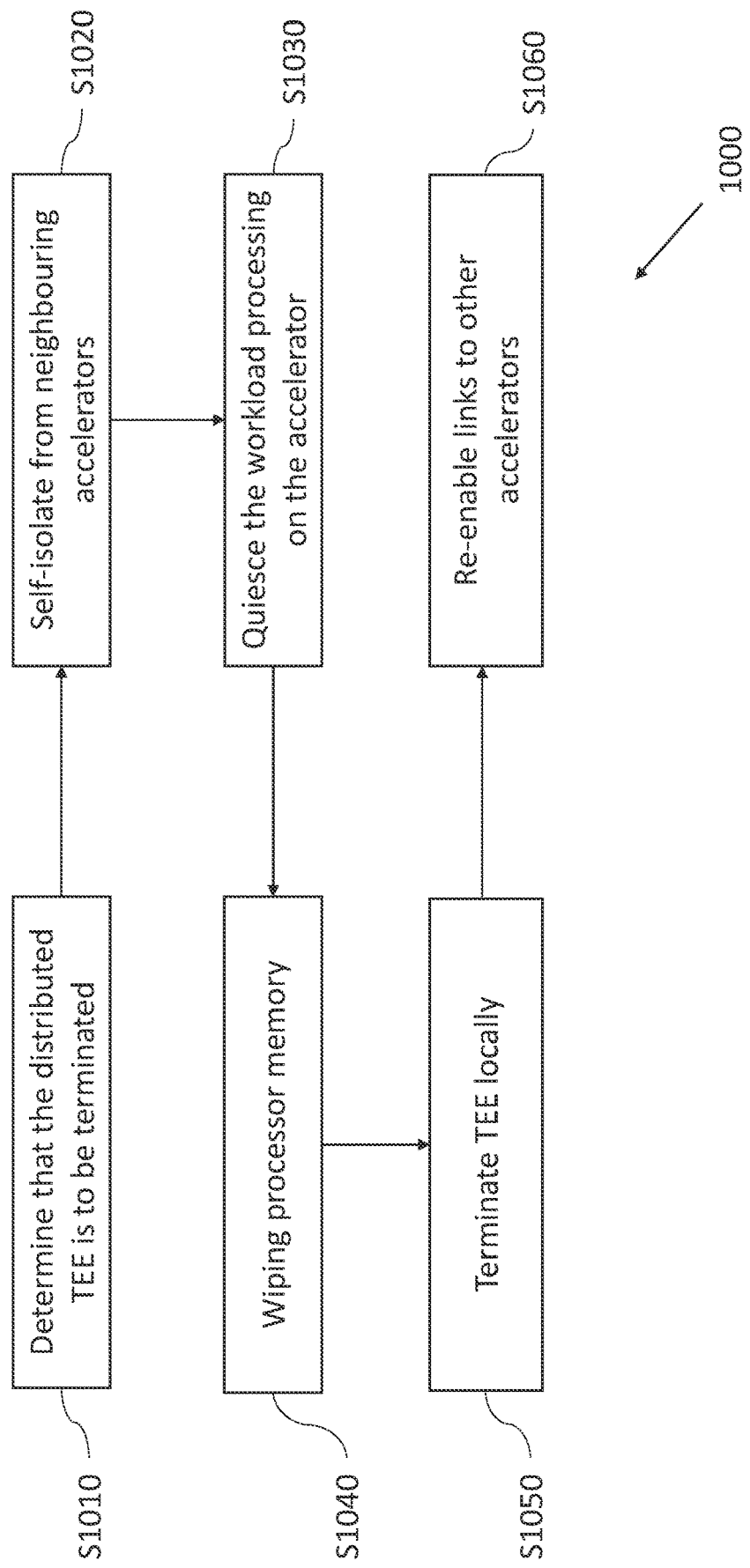
FIG. 10A illustrates a first process, performed with respect to one or more of the accelerators, for implementing a second method for terminating a distributed TEE.
Figure 10B:
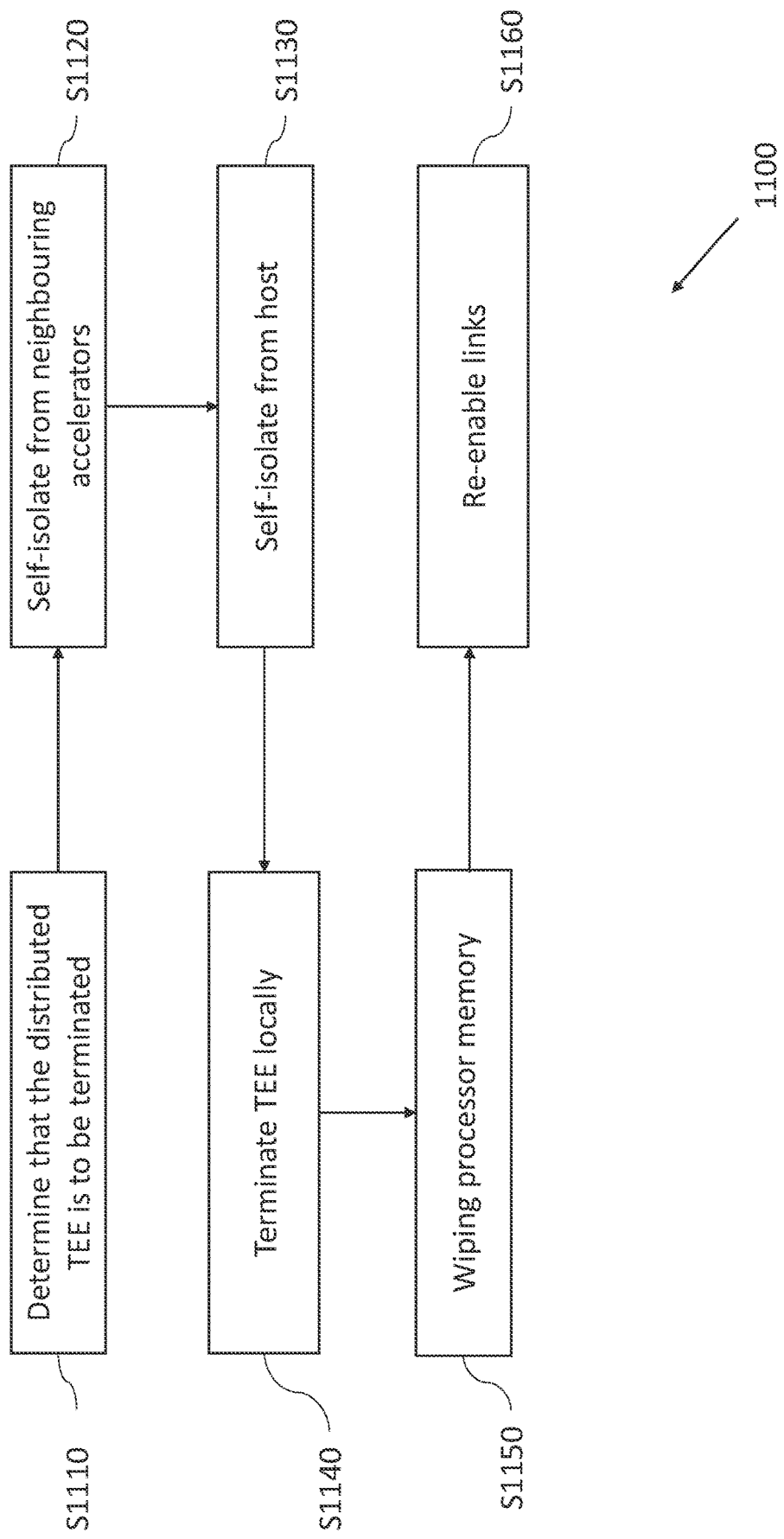
FIG. 10B illustrates a second process, performed with respect to one or more of the accelerators, for implementing the second method for terminating a distributed TEE.

Different processes for implemented the second method are described with reference to FIGS. 10A and 10B. In the example of FIG. 10A, the root of trust 430 for an accelerator 400 controls the process for terminating the TEE locally. In the example of FIG. 10B, processing circuitry of the accelerator 400 responds to a reset of the root of trust 430 by terminating the TEE locally. Both of these processes 1000, 1100 may be implemented together in system 500, with respect to different accelerators 400 of the system 500, so as to implement the second method in the system 500. An example of the combination of the two processes 1000, 1100 is described later with respect to FIG. 11D.

Reference is made to FIG. 10A, which illustrates steps of a process 1000 performed with respect to an accelerator 400 in example embodiments of the second method. This process 1000 is implemented for each of one or more of the accelerators 400 of system 500 and reference is made to FIG. 5 in the following description. For ease of explanation, the process 1000 is described as being performed with respect to accelerator 400b, by processing circuitry associated with accelerator 400b. However, in embodiments, the same steps of the process 1000 are performed by processing circuits associated with one or more others of the accelerators 400 in the system 500, and may be performed with respect to all of the accelerators 400 in the system 500. In embodiments, the processing circuitry associated with an accelerator 400 for performing the steps of process 1000, is the root of trust 430 for that accelerator 400.

Since the accelerator 400b (as shown in the example of FIG. 5) has two neighbours (i.e. accelerator 400a and accelerator 400c), the following description describes certain steps (i.e. steps S1020 and S1060) as being performed with respect to these two neighbouring accelerators 400a, 400c. However, in other embodiments, S1020 and S1060 may be performed with respect to more than two or less than two neighbouring accelerators 400.

At S1010, the processing circuitry associated with the accelerator 400b determines that the distributed TEE established across the system 500 is to be terminated. This determination may be made in a number of different ways. For example, the processing circuitry may determine that the distributed TEE is to be terminated in response to a command from the host 410. Alternatively, the processing circuitry determines that the distributed TEE is to be terminated in response to determining that a failure condition has been reached by its associated accelerator 400b. Alternatively, the processing circuitry determines that the distributed TEE is to be terminated in response to determining that another accelerator 400) (e.g. accelerator 400a or accelerator 400c) connected to its associated accelerator 400b has self-isolated. Each of these options is discussed in more detail later with reference to FIGS. 11A-11C.

At S1020, the processing circuitry associated with the accelerator 400b causes its associated accelerator 400b to self-isolate. When the associated accelerator 400b self-isolates, the accelerator 400b will not accept any traffic received from its neighbouring accelerators 400a, 400c over links 520. This self-isolation may be achieved in different ways.

In one embodiment, the step of S1020 is achieved by each of the interfaces 510 of the accelerator 400b first causing a message to be sent over the links 520 to its neighbouring accelerators 400a, 400c. This message (which may take the form of an error message) indicates to the neighbouring accelerators 400a, 400c that the accelerator 400b that sent the message is self-isolating from the neighbouring accelerators 400a, 400c. The neighbouring accelerators 400a, 400c may require a notification of self-isolation if they have not yet self-isolated, thus informing them of the requirement to self-isolate. After providing the messages over the links 520, the accelerator 400b that sent the message logically disables its links 520 to prevent traffic being received from the other accelerators 400a, 400c. The disabling of the links 520 is performed without wiping the state from the memory of the interfaces 510 of the accelerator 400b. Maintaining the state in the interfaces 510 permits the links 520 to be re-enabled at S1060 without requiring retraining of the links 520.

In another embodiment, the step of S1020 is performed by each of the interfaces 510 of the accelerator 400b disabling the links 520 to its neighbouring accelerators 400a, 400c by wiping the state from the memory of those interfaces 510. The interfaces 510 of the neighbouring accelerators 400a, 400c are configured to detect that the links 510 to the accelerator 400b have been disabled and thus determine, if they have not yet self-isolated, of a requirement to self-isolate. The interface controllers 510, which the accelerators 400a, 400c use to interface with the self-isolated accelerator 400b detect that the links 520 to accelerator 400b are disabled in response to determining that keep-alive packets used to maintain link alignment for the links 520 are not transmitted and received over the links 520. In response to making such a determination, the interfaces 510 causes an interrupt to be sent to the modules 440a, 440c associated with the accelerators 400a, 400c. These modules 440a, 440c then notify the roots of trust 430a, 430c that the links 510 are disabled.

At S1030, the processing circuitry of the accelerator 400b causes the workload executing on the accelerator 400b to stop running and ensures that there is no data exchange between the accelerator 400b and the host 410. S1030 may comprise at least some of the same steps described as being performed for S720 of method 700. However, S1030 does not include the disabling of the links 520 (which, as described above, may be performed as part of S720), since this step has already been performed at S1020.

At S1040, the processing circuitry of the accelerator 400b causes the memory of the tiles 4 to be wiped. This is performed using the technique described above with respect to FIG. 6, i.e. the hardware autoloader 52 issues data packets to write zeros to the memory of the tiles 4 to cause the memory of those tiles 4 to be wiped.

At S1050, the processing circuitry causes a reset of its associated accelerator 400b to be performed, such that the TEE on that associated accelerator 400b is terminated. This reset is the same as the reset of S780 that is described above with respect to method 700.

At S1060, following the reset, the processing circuitry sends a command to the interfaces 510 to initiate re-enable the links 520 with accelerators 400a, 400c. Since the self-isolation steps performed (at S1020) by each of the accelerators 400a, 400b, 400c causes the links 520 to be disabled at each end, it is required for any particular link 520 to be re-enabled by the accelerators 400 at both ends of that link 520 in order for communication across that link 520 to resume. This prevents any code running on one of the accelerators 400 from accessing storage of another of the accelerators 400, until the other accelerator 400 has completed the wiping of tile memory step at S1040 and the reset at S1050.

Additionally, following the wipe of tile memory at S1040, to enable the host 410 to create a new TEE, the processing circuitry causes host access to configuration registers in the interface 402 to be re-enabled, allowing the host 410 to issue commands to the processing circuitry of the accelerator 400b for future TEE establishment.

Reference is made to FIG. 10B, which illustrates steps of a process 1100 that may be performed with respect to an accelerator 400 in example embodiments of the second method. The steps of the process 1100 may be performed by processing circuitry associated with an accelerator 400 in response to a reset event of the root of trust 430 associated with that accelerator 400. For ease of explanation, the steps of the process 1100 are described as being performed with respect to accelerator 400a, but equally could be performed with respect to any of the accelerators 400 of the system 500. In particular, since the accelerator 400a (as shown in the example of FIG. 5) only has a single neighbour (i.e. accelerator 400b), the following description describes certain steps (i.e. S1120 and S1160) as being performed with respect to this single neighbouring accelerator 400b. However, in other embodiments, S1120 and S1160 may be performed with respect to multiple neighbouring accelerators 400.

At S1110, processing circuitry associated with the accelerator 400a determines that the distributed TEE is to be terminated. The processing circuitry makes this determination in response to a reset signal that causes the root of trust 430a for the accelerator 400a to be terminated.

At S1120, the processing circuitry associated with the accelerator 400a causes the accelerator 400a to self-isolate from its neighbouring accelerator 400b. To achieve this, the processing circuitry causes the interface 510 of accelerator 400a to disable the links 520 to that neighbouring accelerator 400b, such that the neighbouring accelerator 400b is unable to write data to the memory of the tiles 4 of the accelerator 400a. S1120 may be the same as S1020 described above with respect to process 1000.

At S1130, the processing circuitry associated with the accelerator 400a, causes the accelerator 400a to self-isolate from the host 410. To achieve this, the processing circuitry causes the interface 402 of accelerator 400a to disable its link 530 with the host 410, such that the host 410 does not have write access to the memory of the tiles 4. In this way, even when the local TEE on accelerator 400a is terminated at S1140, the untrusted host 410 cannot access the data held in the memory of the tiles 4 of accelerator 400a. Although S1130 is shown after S1120, in embodiments, S1130 may also be performed prior to or simultaneously with S1120.

As part of S1130, in addition to disabling the link 530 to the host 410, the processing circuitry may also cause certain blacklist settings to be set in the accelerator 400a so as to, even if the link 530 were enabled, prevent the host 410 from accessing various registers in the accelerator 400a and the memory of the tiles 4.

At S1140, the processing circuitry associated with the accelerator 400a causes the TEE to be terminated locally. This is achieved by erasing from the SXP 401, the one or more keys used for encryption/decryption and any context state used for processing specific encryption frames. The reset of the SXP 401 has the effect of terminating the TEE since, following such a reset, the SXP 401 will no longer be in a state to encrypt and decrypt data passing between the tiles 4 and the host 410.

Additionally, at S1140, the processing circuitry causes the blacklist of registers and tile memory imposed at S1130 to be removed. This will allow the host to have access to tile memory once the link 530 is re-enabled at S1160.

At S1150, the processing circuitry associated with the accelerator 400a causes the tile memory to be wiped. S1150 is performed in the same way as S1040, i.e. the processing circuitry causes the hardware autoloader 52 to write zeros to tile memory.

At S1160, the processing circuitry associated with the accelerator 400a causes the accelerator 400a to exit the state of self-isolation. This includes initiating the re-enabling the link 520 to the neighbouring accelerator 400b in the manner described above for S1060. S1160 further includes sending a message to the interface 402 to cause the link 530 to the host 410 to be renabled. Host access to tile memory may be permitted again, since the secret data has been erased from tile memory at S1150.

In embodiments, S1110 to S1140 of the process 1100 are performed by processing circuitry on the accelerator 400a, with S1150 to S1160 being performed by the root of trust 430a.

Reference is made to FIG. 13, which illustrates the components and exchange of signals that may be used to perform the steps of process 1100 in an accelerator 400 in response to a reset event that occurs for the root of trust 430 associated with that accelerator 400. Although, in the following description, the steps are described with respect to FIG. 13 as being performed with respect to accelerator 400a and root of trust 430a, the same steps may alternatively or additionally be performed with respect to one or more others of the accelerators 400 in the system 500.

As shown, a reset signal is received at the root of trust 430a. This reset signal causes the root of trust 430a to be reset. The same reset signal is also received at the on-chip processing circuitry 1310, which is part of the accelerator subsystem 400a. The reset signal causes the volatile memory contents of the root of trust 430a to be erased. The circuitry 1310, in response to the reset signal, determines at S1110 that the distributed TEE is to be terminated.

The consequence of the determination at S1110 is that the reset circuitry 1310 performs steps S1120 to S1140, as described above with respect to FIG. 10B. As part of performing these steps, at S1120, the circuitry 1310 causes the accelerator 400a to self-isolate from its neighbouring accelerator 400b by preventing traffic from being received over the interface 510 from the neighbouring accelerator 400b. The circuitry 1310 also disables host access to the memory of the tiles 4 at S1130 by disabling the link 530 with the host 410 and, optionally setting blacklist settings to prevent host access to tile memory. At S1140, the circuitry 1310 causes the TEE to be terminated on its accelerator 400a by wiping the state from the SXP 401 of the accelerator 400a. At S1140, the circuitry 1310 also causes any blacklist settings prohibiting access to tile memory that were imposed at S1130 to be removed.

When the root of trust 430a has restarted following the reset event triggered by the reset signal, at S1150, the root of trust 430a causes the tile memory to be wiped at S1150.

At S1160, the root of trust 430a causes the interface 510 to the neighbouring accelerator 400b to be re-enabled such that the accelerator 400a may again receive traffic from this accelerator 400b. The root of trust 430a also causes host access to the memory of tiles 4 of accelerator 400a to be re-enabled.

Therefore, it is understood that steps S1110 to S1140 are performed by circuitry 1310, whereas steps S1150 and S1160 are performed by root of trust 430a.

Figure 11A:
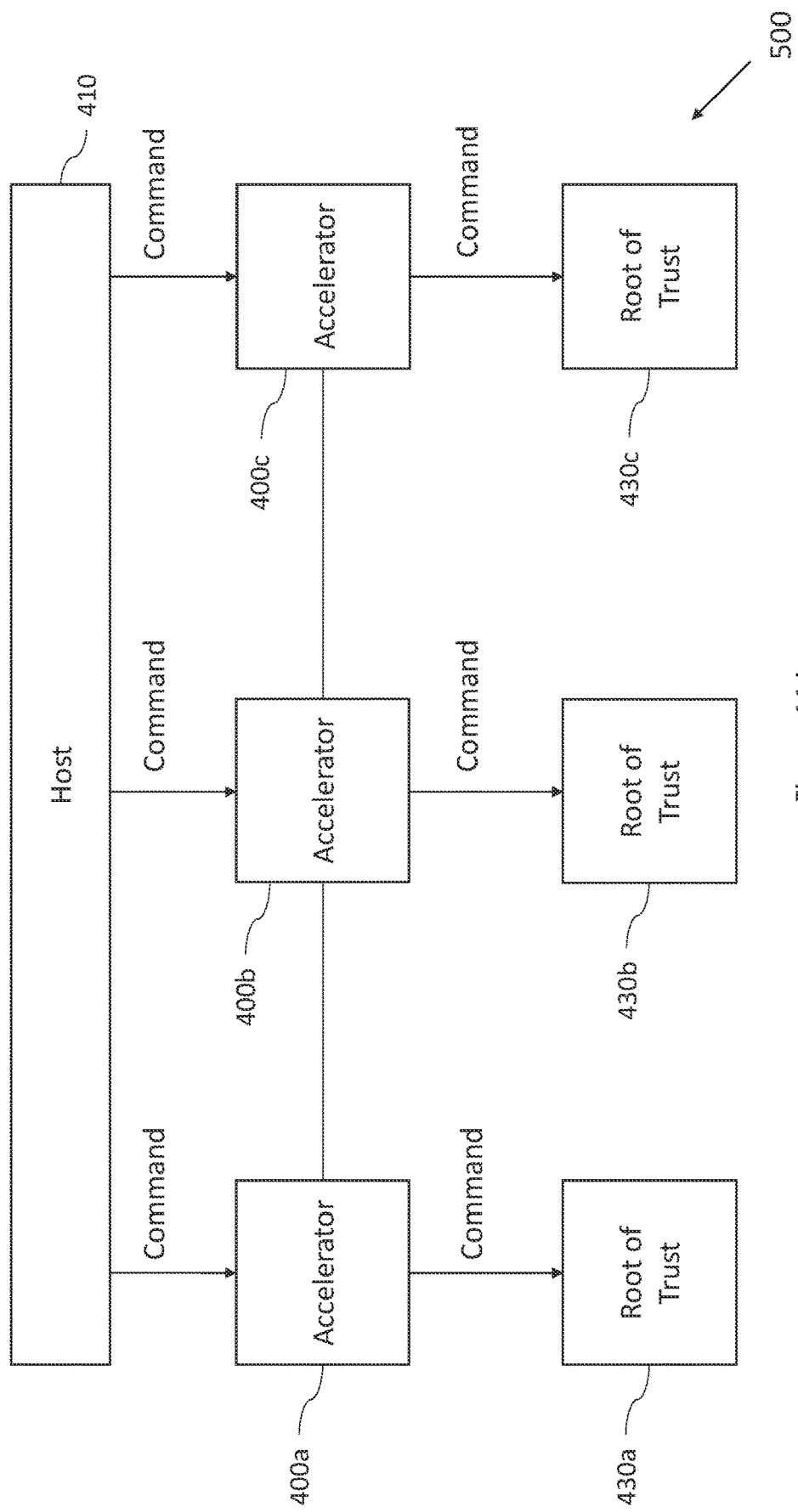
FIG. 11A illustrates the sending of commands by the host to the roots of trust in order to cause the termination of the distributed TEE.
Figure 11B:
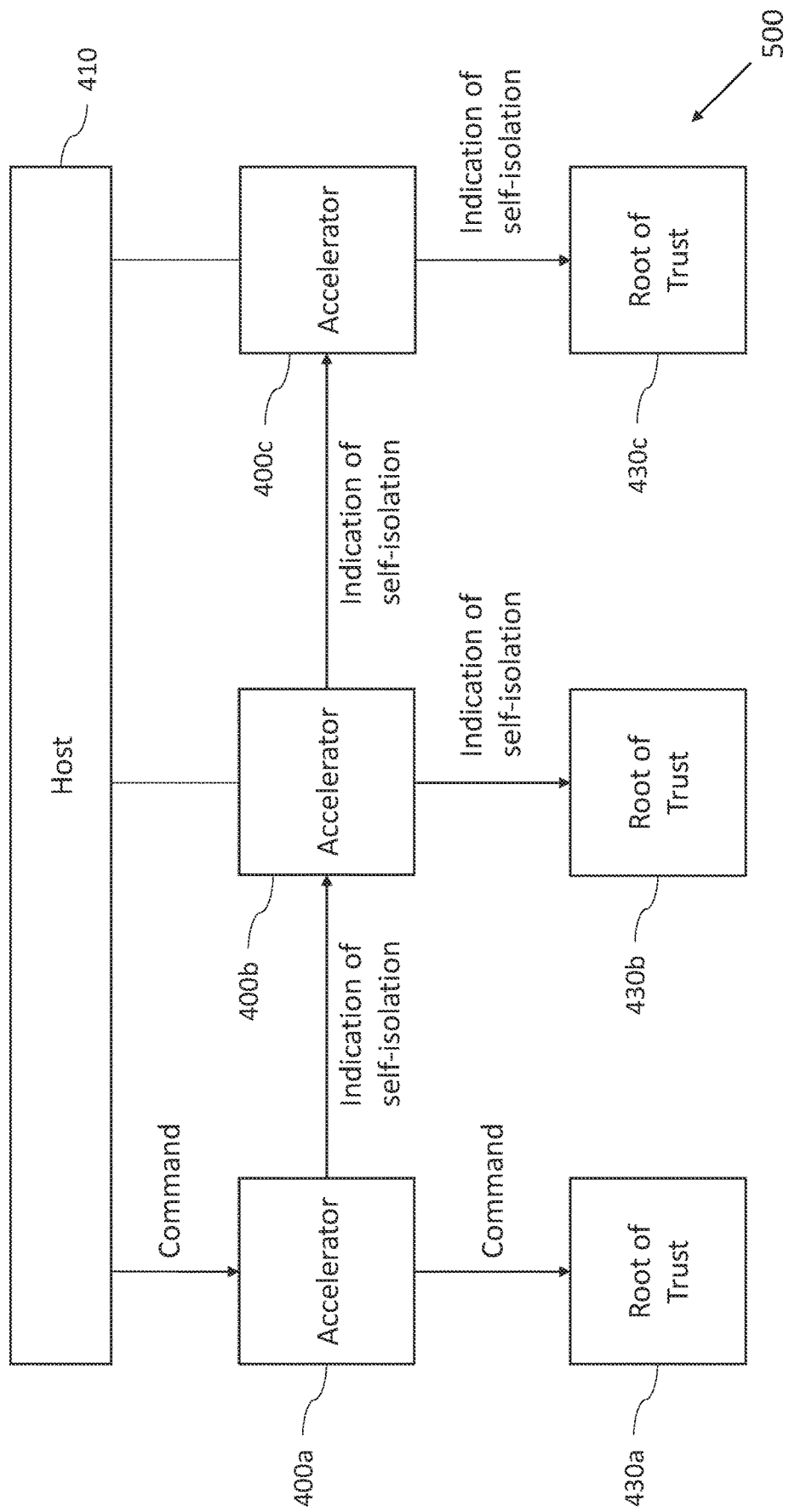
FIG. 11B illustrates the sending of a single command to one of the roots of trust in order to cause the termination of the distributed TEE.
Figure 11C:
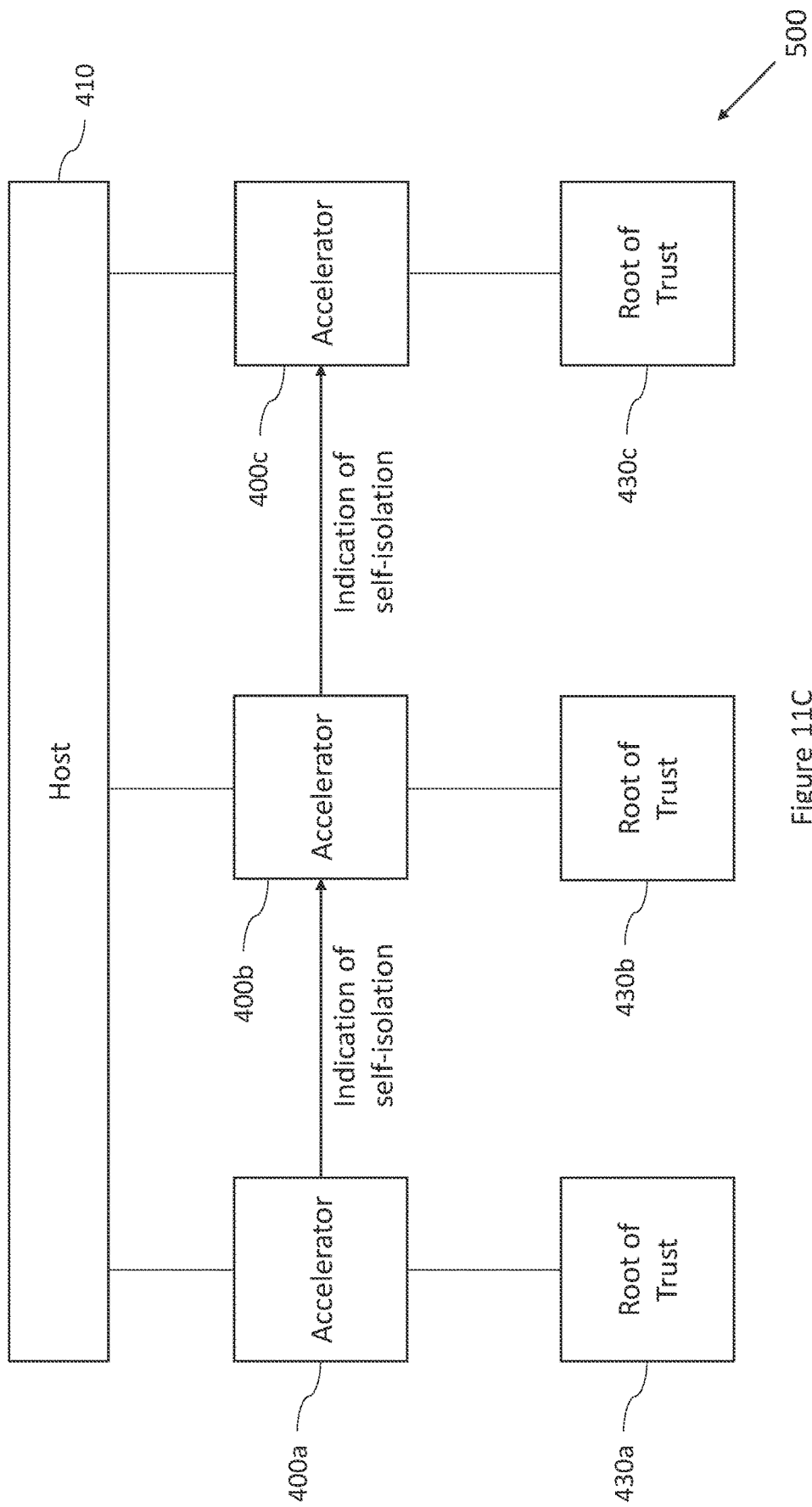
FIG. 11C illustrates the propagation of an error indication through the system of accelerators to cause the distributed TEE to be terminated.
Figure 11D:
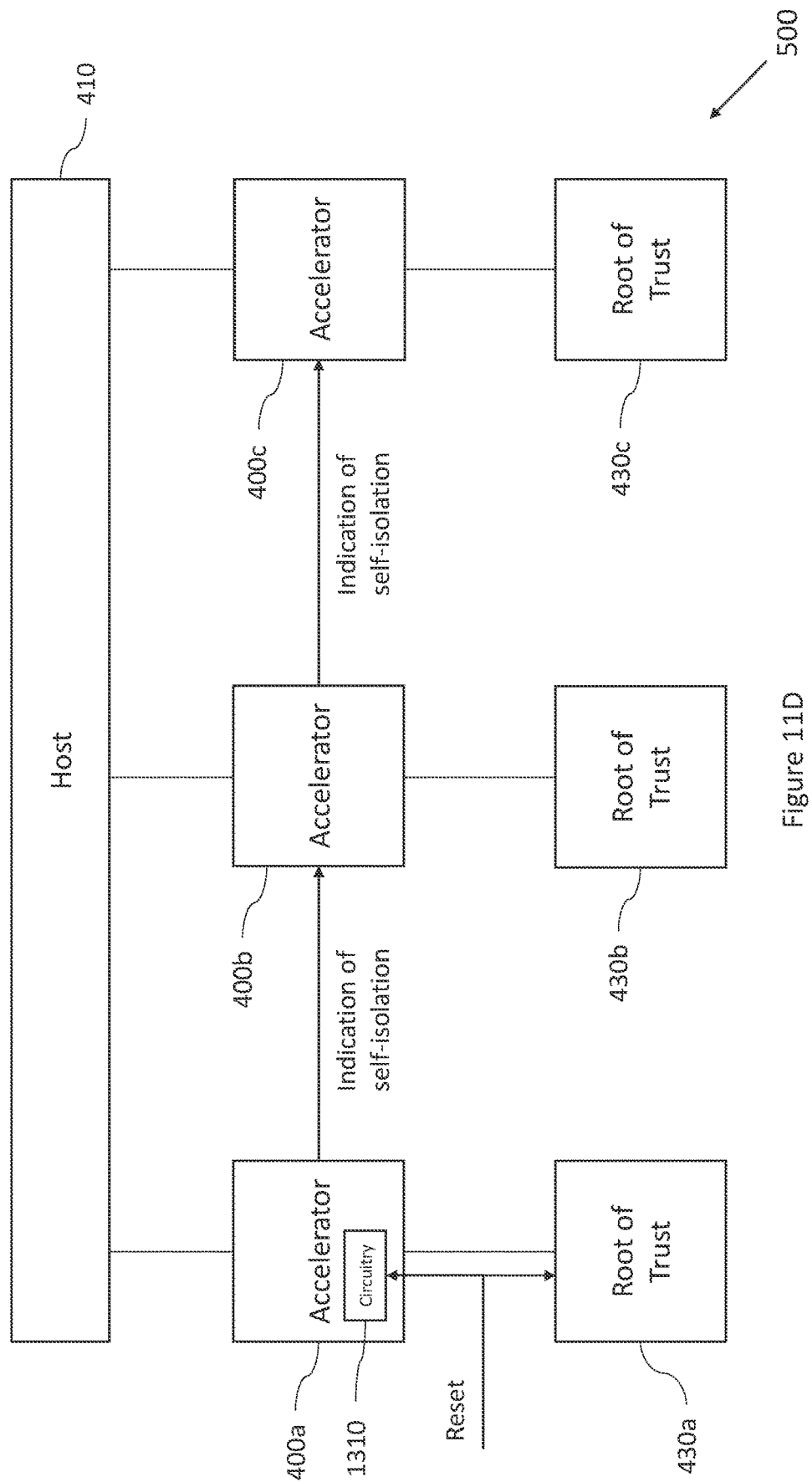
FIG. 11D illustrates a reset event causing the termination of the distributed TEE.

Reference will now be made to FIGS. 11A-D which illustrates the different options by which the different accelerators 400 in the system 500 may determine to self-isolate in embodiments of the second method. FIGS. 11A-C represent embodiments in which the process 1000 is implemented with respect to each of the accelerators 400 of the system 500. FIG. 11D represents an example in which the process 1100 is implemented with respect to one of the accelerators 400 (i.e. accelerator 400a) of the system 500, with the process 1000 being implemented with respect to the other accelerators 400 (i.e. accelerator 400b, 400c) of the system 500.

Reference is made to FIG. 11A, which illustrates how commands may be issued by the host 410 to cause the distributed TEE to be terminated. As shown in FIG. 11A, the host issues a command to each of the accelerators 400a, 400b, 400c. Each of the accelerators 400a, 400b, 400c provides the command to its associated root of trust 430a, 430b, 430c. In response to receipt of the relevant command, each root of trust 430a, 430b, 430c then performs S1010 of process 1000, i.e. it determines that the distributed TEE is to be terminated across the system 500 of accelerators 400. Each of the roots of trust 430a, 430b, 430c then proceeds to perform the remaining steps of process 1000. Since each root of trust 430a, 430b, 430c receives the command from the host 410 informing it of the requirement to terminate the distributed TEE (and therefore of the requirement to self-isolate), in the case exemplified in FIG. 11A, the accelerators 400 are not required to detect the self-isolation of their neighbours in order to determine the requirement to terminate the distributed TEE.

Reference is made to FIG. 11B, which illustrates an alternative scheme by which the roots of trust 430a, 430b, 430c may determine that the distributed TEE is to be terminated. In this scheme, the host 410 issues a command to only a subset of the roots of trust 430. Each root of trust 430 that receives such a command is configured to self-isolate at S1020 of process 1000. The remaining roots of trust 430, which do not receive a command from the host 410, are configured to perform the determination of S1010 in response to determining that one of their neighbouring accelerators 400 has self-isolated. Because the roots of trust 430 are designed to self-determine whether an adjacent root of trust 430 has terminated the TEE on its associated accelerator 400, the roots of trusts 430 that do not receive a command from the host 410, will determine the requirement to self-isolate immediately after the self-isolation of a neighbouring accelerator 400.

As discussed above, when a neighbouring accelerator 400 has self-isolated, a message (e.g. an error message) may be received at the interface 510 over links 520 prior to those links 520 being disabled. A root of trust 430 may determine the requirement to self-isolate in response to this message (or an indication of receipt of the message at the interface 510) being propagated from the interface 510 to the root of trust 430. Alternatively, the determination that a neighbouring accelerator 400 has self-isolated may be made by the interface 510 in response to the link 520 being disabled by deletion of state in the interface 510 of the neighbouring accelerator 400 being performed. The interface 510, upon detecting that the link 520 with the neighbour is disabled, then propagates an indication of the self-isolation of that neighbour to the root of trust 430 of its own accelerator 400.

In the example shown FIG. 11B, the host 410 sends a command to the accelerator 400a to cause the TEE to be terminated on that accelerator 400a, without sending such commands to accelerator 400b and accelerator 400c. This command is propagated to the root of trust 430a associated with the accelerator 400a. In response to receipt of the command, the root of trust 430a causes the accelerator 400a to self-isolate from its neighbouring accelerator 400b. As discussed, this self-isolation may be performed by an interface 520 of accelerator 400a propagating a message (e.g. an error message) over the link 510 to accelerator 400b before logically disabling the link 520 with accelerator 400b. In this case, the interface 510 on accelerator 400b for interfacing with accelerator 400a is configured to receive the message and send an indication of the self-isolation of the accelerator 400a to the root of trust 430b. Alternatively, the self-isolation of the accelerator 400a may be performed by the state for the link 520 (between accelerator 400a and accelerator 400b) that is held in the memory of the interface 510 of accelerator 400a for interfacing with accelerator 400b being wiped. In this case, the interface 510 on accelerator 400b for interfacing with accelerator 400a detects the disabling of the link 520 and sends an indication of the self-isolation of the accelerator 400a to the root of trust 430b.

The root of trust 430b associated with accelerator 400b then performs S1010 in response to receipt of the indication that accelerator 400a has self-isolated. In response to the determination at S1010, accelerator 400b performs S1020 and self-isolates in the same manner as accelerator 400a. The root of trust 430c associated with the accelerator 400c then detects the self-isolation of accelerator 400b in the same way in which the root of trust 430b associated with accelerator 400b detected the self-isolation of accelerator 400a. In this way, the indication that there is a requirement for the distributed TEE to be terminated is propagated throughout the system 500 via the self-isolation of the accelerators 400.

Reference is made to FIG. 11C, which illustrates an alternative scheme by which the roots of trust 430a, 430b, 430c may be informed of the requirement to self-isolate. In this scheme, one of the accelerators 400 encounters a condition requiring that that accelerator 400 is to be reset.

The condition could be a failure condition (e.g. an unrecoverable error condition). Such a failure condition could be associated with various different components of the failed accelerator 400 and is detected by hardware of the accelerator 400. The failure condition is propagated to the root of trust 430 associated with the accelerator 400, with the root of trust 430 causing the failed accelerator 400 to self-isolate.

The self-isolation of the failed accelerator 400 is detected at the neighbours of the failed accelerator 400 (either by receipt of an error message from the failed accelerator or by detecting disabling of the links 520, as discussed). An indication of the self-isolation then propagates through the system 500 of accelerators in same manner as described above with respect to FIG. 11B.

In the example of FIG. 11C, the accelerator 400a has encountered a failure condition. An indication of this failure condition is sent to the root of trust 430a associated with the accelerator 400a. The root of trust 430a determines (at S1010) from the indication of the failure condition that the distributed TEE is to be terminated. At S1020, the root of trust 430a then causes the accelerator 400a to be isolated from accelerator 400b. The interface 510 of accelerator 400b detects that the accelerator 400a is self-isolated (either from a message received from accelerator 400a or by detecting that the link 520 with the accelerator 400a is disabled) and, in response, signals this to the root of trust 430b. The root of trust 430b determines (at S1010) from the received signal that the distributed TEE is to be terminated. The root of trust 430b at S1020 then causes the accelerator 400b to self-isolate at S1020. The root of trust 430c then detects the self-isolation of accelerator 400b in the same manner that root of trust 430b detected the self-isolation of accelerator 400a. In this way, the indication of the self-isolation propagates along through the system of accelerators 400.

Reference is made to FIG. 11D, which illustrates an alternative scheme by which processing circuitry associated with each of the accelerators 400a, 400b, 400c may determine that the distributed TEE is to be terminated. In this example, the distributed TEE is terminated in response to a reset of the root of trust 430a associated with accelerator 400a.

In this example, to perform the second method, processing circuitry associated with accelerator 400a implements process 1100, whereas processing circuitry associated with accelerators 400b, 400c implements process 1000 for both accelerators 400b, 400c. For accelerator 400a, the steps S1110 to S1140 are performed by the circuitry 1310 in the manner described above with reference to FIG. 13. Additionally, S1150 and S1160 are performed by root of trust 430a. For accelerator 400b, the steps S1010 to S1060 are performed by root of trust 430b. For accelerator 400c, the steps S1010 to S1060 are performed by root of trust 430c.

At S1110, the circuitry 1310 of accelerator 400a determines (at S1110) that the distributed TEE is to be terminated in response to receipt of the reset signal, which causes the root of trust 430a to reset. When the circuitry 1310 (at S1120) causes the accelerator 400a to self-isolate from its neighbouring accelerator 400b, an indication of that self-isolation is received at accelerator 400b. The interface 510 of accelerator 400b detects that the accelerator 400a is self-isolated (either from a message received from accelerator 400a or by detecting that the link 520 with the accelerator 400a is disabled) and, in response, signals this to the root of trust 430b. The root of trust 430b determines (at S1010) from the received signal that the distributed TEE is to be terminated. In response to detecting that the accelerator 400*a* has self-isolated, the root of trust 430*b* at S1020 then causes the accelerator 400*b* to self-isolate at S1020. The root of trust 430*c* then detects the self-isolation of accelerator 400*b* in the same manner that root of trust 430*b* detected the self-isolation of accelerator 400*a*. In this way, the indication of the self-isolation propagates along through the system of accelerators 400.

Figure 12:
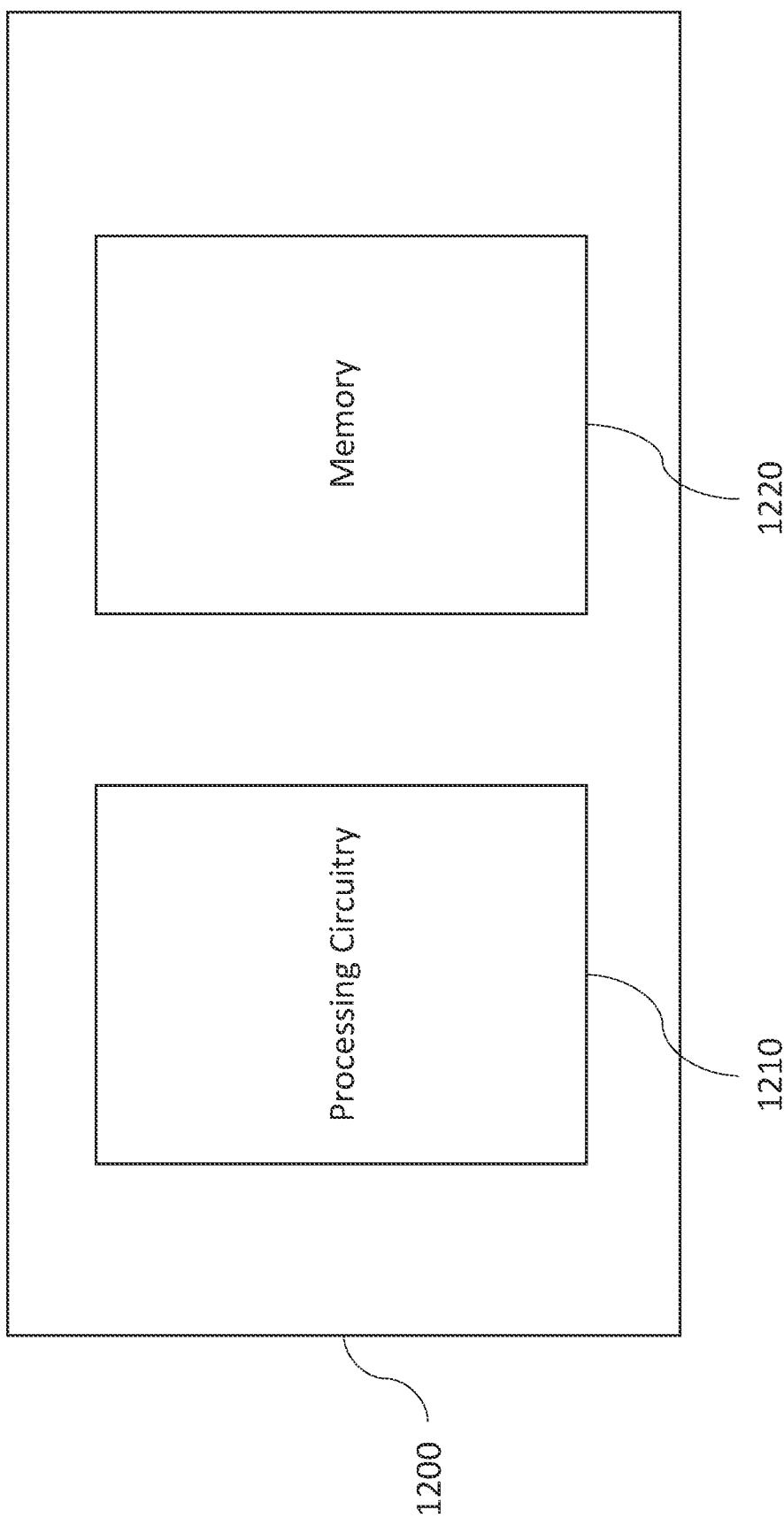
FIG. 12 illustrates a schematic diagram of processing circuitry for implementing embodiments of the first method or the second method.

Reference is made to FIG. 12, which illustrates an example embodiment of hardware 1200 that may be used to implement either the root of trust 430 or the circuitry 1310 discussed above. The hardware 1200 comprises processing circuitry 1210 configured to perform the operations described above. The processing circuitry 1210 preferably comprises a processor configured to execute computer readable instructions to perform the operations described as being performed by the hardware 1200. The hardware 1200 comprises a memory 1220 for storing the information required to perform the operations described above. The memory 1220 stores the computer readable instructions for execution by the processing circuitry 1210 to perform the operations described above. The processing circuitry 1210 may alternatively or additionally comprise field programmable gate arrays (FPGAs) and/or application specific integrated circuits (ASICs) for performing the operations described.

In the examples described, the accelerator subsystems 400 have been described as multi-tile processing units. However, in some embodiments, the accelerators 400 may be different types of devices, and the teaching above, which refers to "tiles 4" and "tile memory" may also be taken to apply to only to a single processor of such accelerators 400 and the memory of that single processor.

It will be appreciated that the above embodiments have been described by way of example only.

The invention claimed is:

1. A system comprising a plurality of accelerator subsystems for processing workloads provided by an untrusted host system, wherein each of the accelerator subsystems comprises:
   at least one processor for executing application instructions to perform operations using workload data to produce results data;
   at least one processor memory for storing the workload data and the results data;
   at least one encryption unit configured to provide a trusted execution environment on a respective accelerator subsystem by performing encryption of data dispatched from the at least one processor of the respective accelerator subsystem to the untrusted host system and decryption of data received at the respective accelerator subsystem from the untrusted host system, wherein the provision of the trusted execution environments on each of the accelerator subsystems provides a distributed trusted execution environment across the plurality of accelerator subsystems for processing the workloads; and
   one or more interfaces for interfacing with one or more connected ones of the accelerator subsystems and exchanging data with those one or more connected ones of the accelerator subsystems,
   wherein each of the accelerator subsystems is associated with processing circuitry configured to, in response to determining that the distributed trusted execution environment is to be terminated, perform the following steps with respect to its associated accelerator subsystem:
   causing the associated accelerator subsystem to self-isolate by preventing traffic from being received over the one or more interfaces from the one or more connected ones of the accelerator subsystems;
   causing the workload data and the results data to be erased from the at least one processor memory of the associated accelerator subsystem;
   subsequent to causing the associated accelerator subsystem to self-isolate, causing the trusted execution environment on the associated accelerator subsystem to be terminated; and
   subsequent to the causing of the workload data and the results data to be erased, initiating, for the associated accelerator subsystem, reactivation of communication links with the one or more connected ones of the accelerator subsystems.

2. The system of claim 1, wherein for each of the accelerator subsystems, at least part of the processing circuitry associated with the respective accelerator subsystem belongs to a root of trust associated with the respective accelerator subsystem.

3. The system of claim 1, wherein, for each of one or more of the accelerator subsystems, the associated processing circuitry is configured to determine that the trusted execution environment is to be terminated in response to receipt of a command from the untrusted host system.

4. The system of claim 1, wherein the processing circuitry associated with a first of the accelerator subsystems is configured to determine that the distributed trusted execution environment is to be terminated in response to determining that a second of the accelerator subsystems connected to the first of the accelerator subsystems has self-isolated.

5. The system of claim 4, wherein the step of determining that the second of the accelerator subsystems connected to the first of the accelerator subsystems has self-isolated is performed in response to a message received at the first of the accelerator subsystems from the second of the accelerator subsystems, prior to the second of the accelerator subsystems disabling its communication link with the first of the accelerator subsystems.

6. The system of claim 4, wherein the step of determining that the second of the accelerator subsystems connected to the first of the accelerator subsystems has self-isolated is performed in response to detecting at the first of the accelerator subsystems that a communication link with the second of the accelerator subsystems has been disabled by the second of the accelerator subsystems.

7. The system of claim 1, wherein for each of one or more of the accelerator subsystems, the processing circuitry associated with the respective accelerator subsystem is configured to determine that the distributed trusted execution environment is to be terminated in response to receipt of a reset signal for resetting a root of trust associated with the respective accelerator subsystem.

8. The system of claim 1, wherein for each of one or more of the accelerator subsystems, the processing circuitry associated with the respective accelerator subsystem is configured to: perform the step of causing the workload data and the results data to be erased prior to the step of causing the trusted execution environment on the associated accelerator subsystem to be terminated.

9. The system of claim 1, wherein for each of one or more of the accelerator subsystems, the processing circuitry associated with the respective accelerator subsystem is configured to:

in response to determining that the distributed trusted execution environment is to be terminated, disable access by the untrusted host system to the at least one processor memory; and perform the step of causing the trusted execution environment on the associated accelerator subsystem to be terminated subsequent to the disabling of access to the at least one processor memory by the untrusted host system, and prior to the causing the workload data and the results data to be erased.

10. The system of claim 9, wherein the disabling of access to the at least one processor memory by the untrusted host system comprises disabling a communication link between the untrusted host system and the associated accelerator subsystem.

11. The system of claim 9, wherein for each of the one or more of the accelerator subsystems, the processing circuitry associated with the respective accelerator subsystem is configured to:

subsequent to the step of causing the workload data and the results data to be erased, re-enable access by the untrusted host system to the at least one processor memory.

12. The system of claim 1, wherein for each of one or more of the accelerator subsystems, the processing circuitry associated with the respective accelerator subsystem is configured to determine that the trusted execution environment is to be terminated in response to receipt of an indication of a failure condition on the associated accelerator subsystem.

13. The system of claim 1, wherein for each of the plurality of accelerator subsystems, the processing circuitry associated with the respective accelerator subsystem is configured to perform the step of causing the trusted execution environment to be terminated by issuing a command to cause state stored in the at least one encryption unit to be reset.

14. The system of claim 1, wherein for each of the plurality of accelerator subsystems, the causing the trusted execution environment to be terminated on the respective accelerator subsystem comprises causing keys used for encryption and decryption operations to be erased from the at least one encryption unit.

15. The system of claim 1, wherein for each of the accelerator subsystems, the step of causing the workload data and results data to be erased from the at least one processor memory comprises causing a hardware module of the respective accelerator subsystem to issue data packets to write zeroes to the at least one processor memory.

16. The system of claim 1, wherein each of the communication links is configured to be re-enabled in response to both accelerator subsystems between which it passes data, initiating reactivation of the respective communication link.

17. The system of claim 1, wherein for each of the accelerator subsystems, the processing circuitry associated with the respective accelerator subsystem is configured to:

prior to the causing the workload data and results data to be erased from the at least one processor memory, disable host access to the respective accelerator subsystem by adjusting settings in an interface of the respective accelerator subsystem for interfacing with the untrusted host system.

18. A method for terminating a distributed trusted execution environment across a plurality of accelerator subsystems, the plurality of accelerator subsystems being configured to process workloads provided by an untrusted host system, wherein the distributed trusted execution environment is provided by a plurality of local trusted execution environments, each of which is established on one of the accelerator subsystems by performing encryption of data dispatched from at least one processor of a respective accelerator subsystem to the untrusted host system and decryption of data received at the respective accelerator subsystem from the untrusted host system, wherein the method comprises: for a first one of the accelerator subsystems, in response to determining that the distributed trusted execution environment is to be terminated:

causing the first one of the accelerator subsystems to self-isolate by preventing traffic from being received over one or more interfaces of the first one of the accelerator subsystems from one or more connected other ones of the accelerator subsystems;

causing workload data and results data to be erased from memory of the first one of the accelerator subsystems;

subsequent to causing the first one of the accelerator subsystems to self-isolate, causing a first one of the local trusted execution environments, provided on the first one of the accelerator subsystems, to be terminated; and subsequent to the step of causing the workload data and the results data to be erased, initiate reactivation of communication links with the one or more connected other ones of the accelerator subsystems.

19. A non-transitory computer readable medium storing a computer program comprising computer readable instructions, wherein the computer readable instructions are associated with a first accelerator subsystem of a plurality of accelerator subsystems for processing workloads provided by an untrusted host system, wherein the computer readable instructions are executed by at least one processor, a method for terminating a distributed trusted execution environment is performed, wherein the distributed trusted execution environment is provided by a plurality of local trusted execution environments, each of which is established on one of the accelerator subsystems by performing encryption of data dispatched from at least one processing unit of the respective accelerator subsystem to the untrusted host system and decryption of data received at the respective accelerator subsystem from the untrusted host system, wherein the method comprises for the first accelerator subsystem, in response to determining that the distributed trusted execution environment is to be terminated:

causing the first accelerator subsystem to self-isolate by preventing traffic from being received over one or more interfaces of the first accelerator subsystem from one or more connected ones of the plurality of accelerator subsystems;

causing workload data and results data to be erased from memory of the first accelerator subsystem;

subsequent to causing the first accelerator subsystem to self-isolate, causing a local trusted execution environment provided on the first accelerator subsystem to be terminated; and subsequent to the step of causing the workload data and the results data to be erased, initiate reactivation of communication links with the respective one or more connected ones of the plurality of accelerator subsystems.

* * * * *